United States Patent
Levner et al.

(10) Patent No.: US 7,356,224 B2
(45) Date of Patent: Apr. 8, 2008

(54) METHOD AND APPARATUS FOR DETECTING MULTIPLE OPTICAL WAVE LENGTHS

(75) Inventors: Daniel Levner, Toronto (CA); Martin F. Fay, Providence, RI (US); Jingming Xu, Providence, RI (US)

(73) Assignee: Brown University Research Foundation, Providence, RI (US)

( * ) Notice: Subject to any disclaimer, the term of this patent is extended or adjusted under 35 U.S.C. 154(b) by 110 days.

(21) Appl. No.: 10/519,577

(22) PCT Filed: Jun. 27, 2003

(86) PCT No.: PCT/US03/20237

§ 371 (c)(1),
(2), (4) Date: Dec. 27, 2004

(87) PCT Pub. No.: WO2004/003598

PCT Pub. Date: Jan. 8, 2004

(65) Prior Publication Data

US 2006/0051022 A1 Mar. 9, 2006
US 2007/0196047 A9 Aug. 23, 2007

Related U.S. Application Data

(63) Continuation-in-part of application No. 10/188,530, filed on Jul. 3, 2002.

(51) Int. Cl.
*G02B 6/34* (2006.01)

(52) U.S. Cl. .......................................... 385/37; 385/31
(58) Field of Classification Search ..................... None
See application file for complete search history.

(56) References Cited

U.S. PATENT DOCUMENTS

| | | | |
|---|---|---|---|
| 6,002,822 A | 12/1999 | Strasser et al. | 385/48 |
| 6,084,997 A | 7/2000 | Utaka et al. | 385/37 |
| 6,141,370 A | 10/2000 | Avrutsky et al. | 372/102 |
| 6,181,852 B1 | 1/2001 | Adams et al. | 385/37 |
| 6,208,377 B1 | 3/2001 | Wickham et al. | 385/10 |

(Continued)

FOREIGN PATENT DOCUMENTS

JP 8-184789 7/1996

OTHER PUBLICATIONS

Bismuth, J., Superimposed gratings WDM on Ge-Doped silica on silicon planar waveguide Lasers and Electro-Optics, 1996. CLEO '96., Jun. 1996, pp. 513-514.

(Continued)

*Primary Examiner*—Sung Pak
(74) *Attorney, Agent, or Firm*—Dorsey & Whitney LLP

(57) ABSTRACT

Optical gratings that perform a number of functions at various wavelengths are formed by various methods that preserve spectral information within a wavelength band, the functions including: coupling radiation from one waveguide to another, controllable gratings that operate on different wavelengths in response to external control signals.

25 Claims, 28 Drawing Sheets

U.S. PATENT DOCUMENTS

| | | | |
|---|---|---|---|
| 6,289,032 B1 | 9/2001 | Fay et al. | 372/102 |
| 6,334,013 B1 | 12/2001 | Laming et al. | 385/37 |
| 6,393,172 B1 | 5/2002 | Brinkman et al. | 385/16 |
| 6,415,081 B1 | 7/2002 | Levner et al. | 385/37 |
| 6,424,763 B1 * | 7/2002 | Villeneuve et al. | 385/27 |
| 6,549,707 B1 | 4/2003 | Lupu et al. | 385/37 |
| 6,597,838 B1 | 7/2003 | Park et al. | 385/37 |
| 6,657,786 B2 * | 12/2003 | Levner et al. | 359/559 |
| 6,819,460 B1 | 11/2004 | Babbitt et al. | 359/11 |
| 6,879,441 B1 | 4/2005 | Mossberg | 359/569 |
| 6,937,638 B2 | 8/2005 | Fish et al. | 372/102 |
| 2002/0154410 A1 * | 10/2002 | Levner et al. | 359/559 |
| 2003/0007733 A1 * | 1/2003 | Levner et al. | 385/37 |

OTHER PUBLICATIONS

Chik, H, A 1×8 Supergrating Tap-off WDM device Lasers and Electro-optics Europe, 1996. CLEO/Europe. Sep. 1996, p. 231.

Avrutsky, I.A. et al., "Design of Widely Tunable Semiconductor Lasers and the Concept of Binary Superimposed Gratings (BSG's)", IEEE Journal of Quantum Electronics, Apr. 1998, vol. 34, No. 4, pp. 729-741.

Salvik. R., High Performance All-Fiber Fabry-Perot Filters With Superimposed Chirped Bragg Gratings Journal of Lightwave Technology, Apr. 2003, vol. 21, No. 4, pp. 1059-1065.

Avrutsky, I.A. et al., "Design of Widely Tunable Semiconductor Lasers and the Concept of Binary Superimposed Gratings (BSG's)", Apr. 1998, pp. 729-741, vol. 34, Issue: 4, IEEE Journal of Quantum Electronics.

* cited by examiner

COUPLED WAVEGUIDES, 7c4

PROGRAMMABLE SUPERGRADING EMPLOYING
ELECTRO-OPTIC POLYMER $$\lambda_1 = \frac{\lambda_0}{(n_{eff})_1} \quad \lambda_2 = \frac{\lambda_0}{(n_{eff})_2}$$
ASYMMETRIC WAVEGUIDES
$(\lambda_1 \neq \lambda_2)$

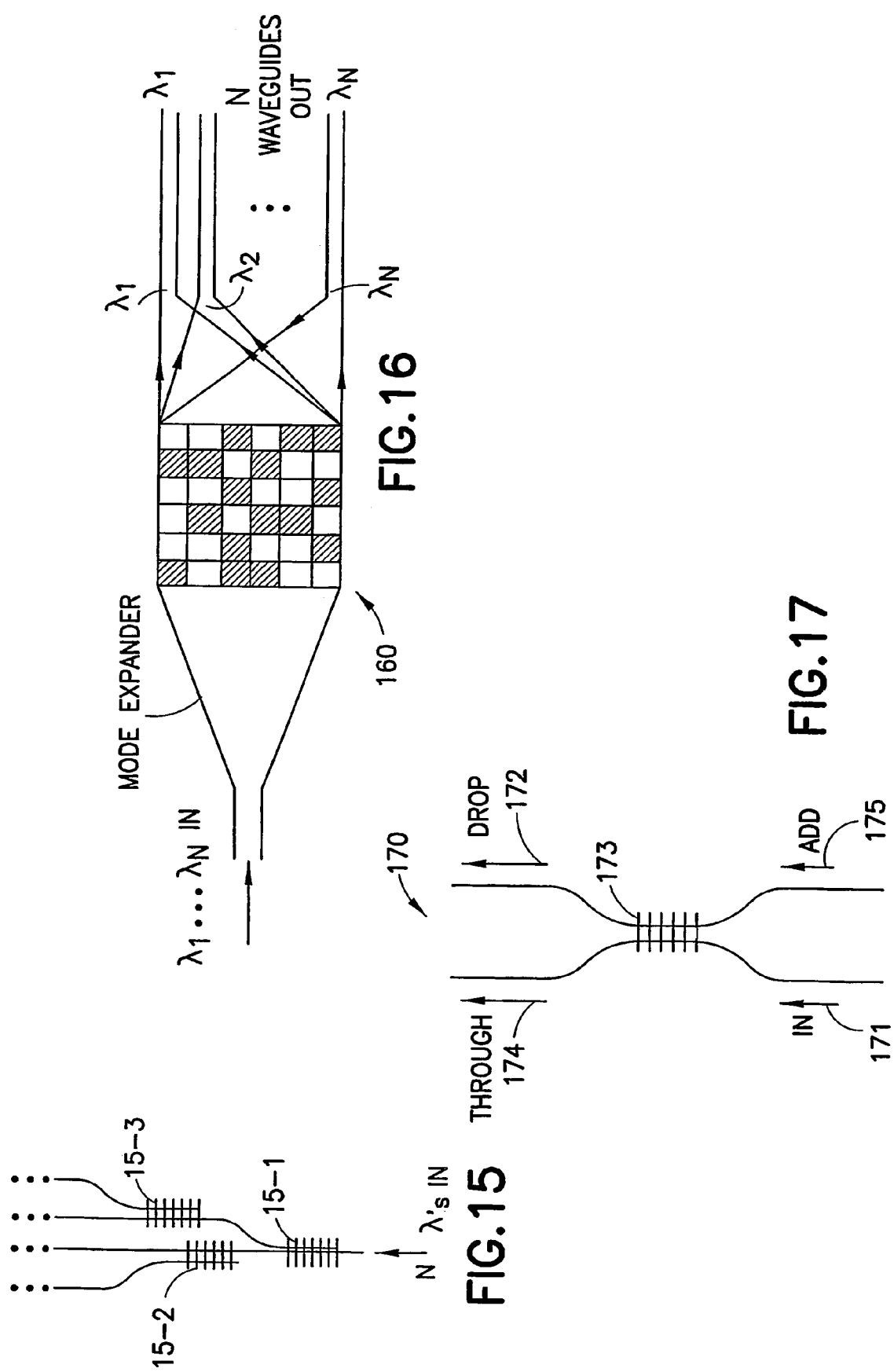

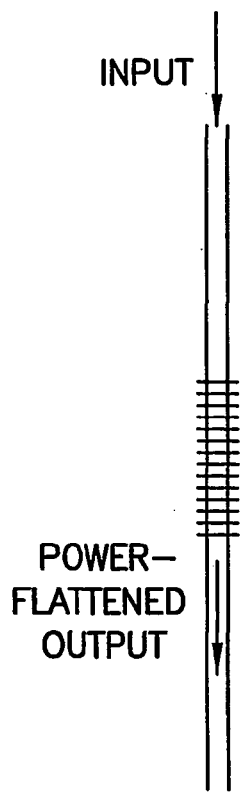
FIG.22a
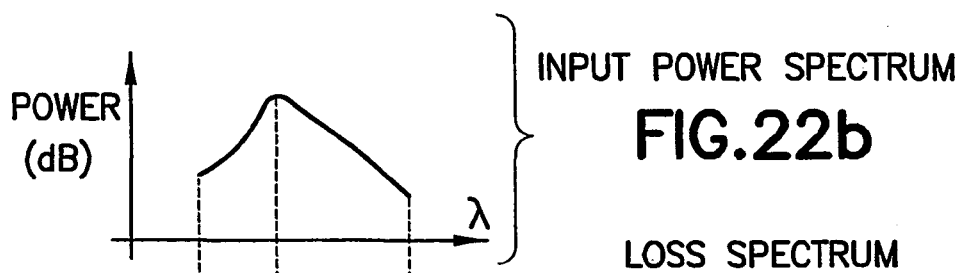
FIG.22b INPUT POWER SPECTRUM
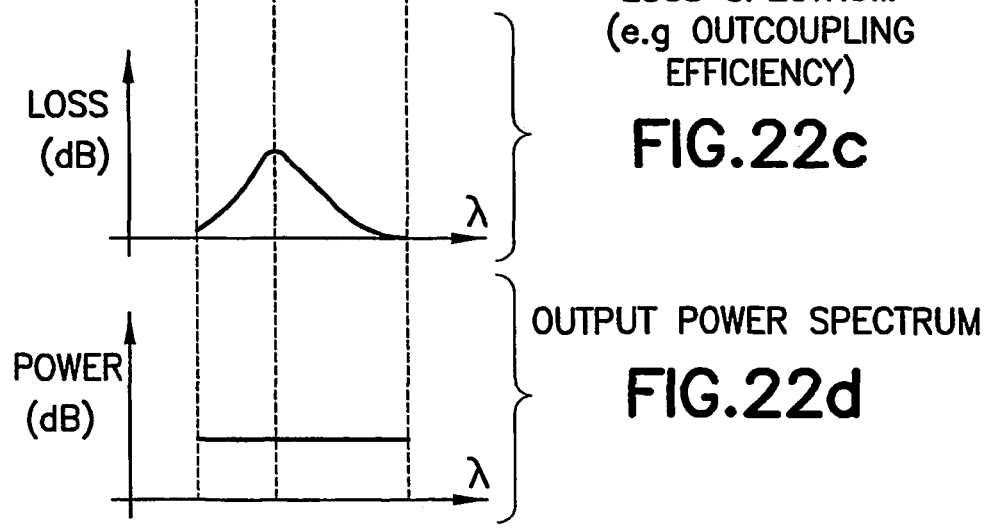
FIG.22c LOSS SPECTRUM (e.g OUTCOUPLING EFFICIENCY)
FIG.22d OUTPUT POWER SPECTRUM

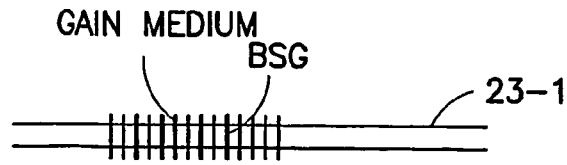
FIG. 23a
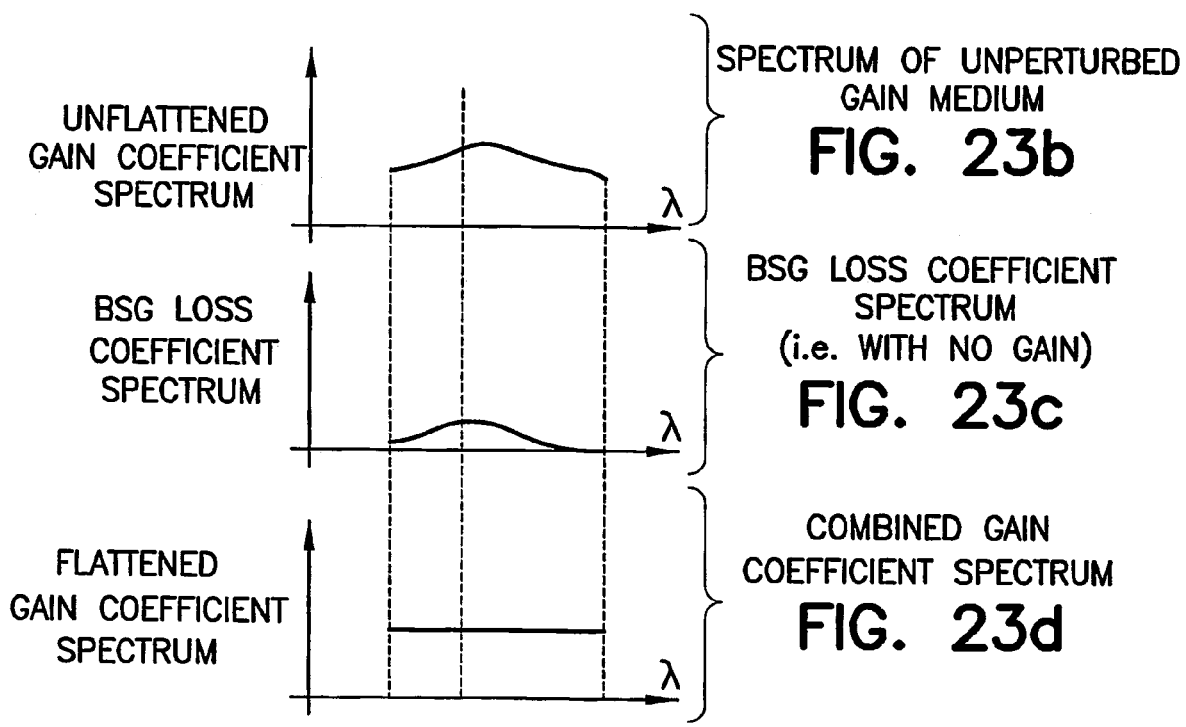
FIG. 23b SPECTRUM OF UNPERTURBED GAIN MEDIUM
FIG. 23c BSG LOSS COEFFICIENT SPECTRUM (i.e. WITH NO GAIN)
FIG. 23d COMBINED GAIN COEFFICIENT SPECTRUM

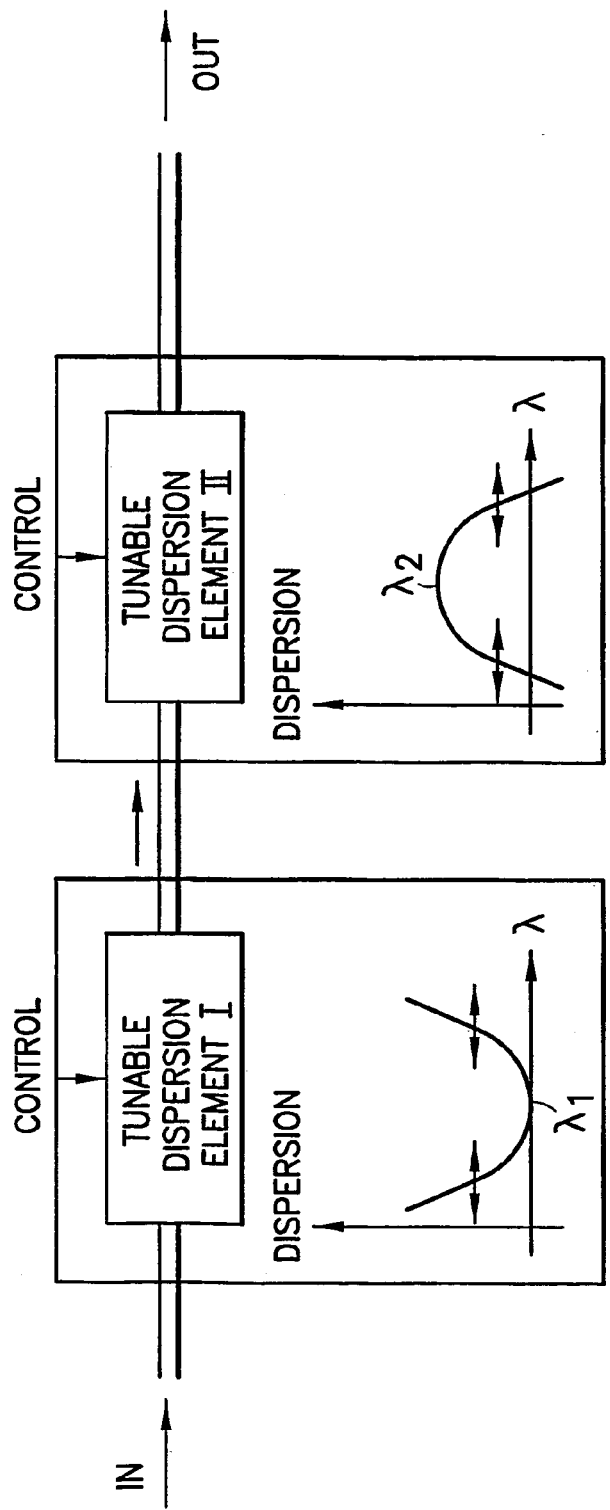
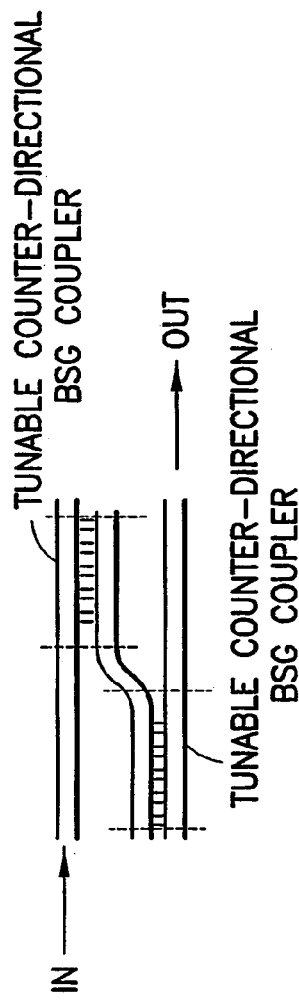
FIG.26a
FIG.26b

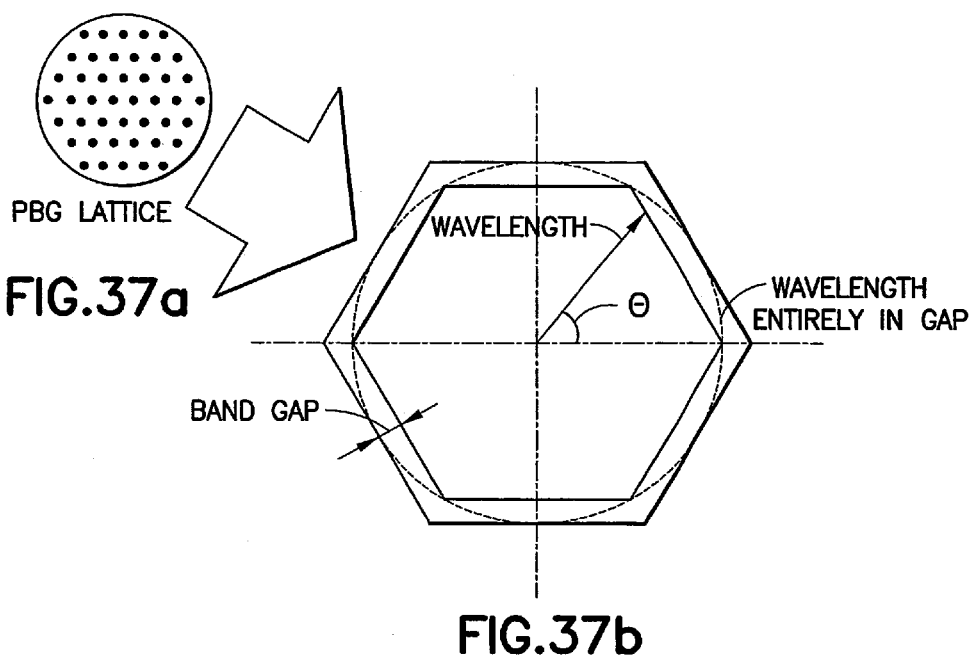
FIG.37a
FIG.37b
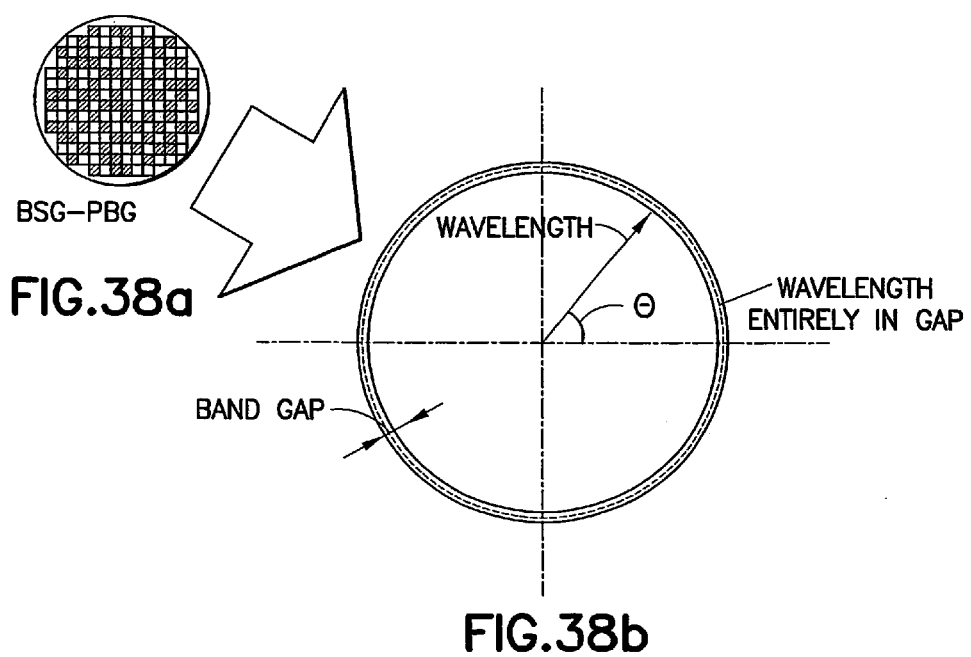
FIG.38a
FIG.38b

METHOD AND APPARATUS FOR DETECTING MULTIPLE OPTICAL WAVE LENGTHS

BENEFICT CLAIM

This application is a continuation-in-part of U.S. Ser. No. 10/188,530, filed on Jul. 3, 2002, and claims benefit thereto.

BACKGROUND OF THE INVENTION

1. Field of the Invention

The present invention relates generally to detecting optical signals and, more particularly, to detecting multiple optical wavelengths with optical supergratings.

2. Prior Art

Gratings are optical devices used to achieve wavelength-dependent characteristics by means of optical interference effects. These wavelength-dependent optical characteristics can, for instance, serve to'reflect light of a specific wavelength while transmitting or refracting light at all other wavelengths. Such characteristics are useful in a wide range of situations, including the extraction of individual wavelength-channels in Wavelength Division Multiplexed (WDM) optical communication systems, or providing wavelength-specific feedback for tunable or multi-wavelength semiconductor lasers. Gratings are usually implemented by modulating (varying) the effective index of refraction of a waveguiding structure. These changes in index of refraction cause incident light wavelengths to be reflected or refracted: in the case of an abrupt interface between two index values, light incident directly on the interface is reflected according to the well known Fresnel reflection law.

The term "multi-wavelength grating" generally refers to a grating that is capable of exhibiting optical characteristics at a number of wavelengths. For example, a multi-wavelength grating can be a grating that reflects light at several select wavelengths (which can correspond to specific optical communication channels), yet is transparent to light at other wavelengths. In some situations, however, there is a need to set the optical characteristics for a continuous range of wavelengths, rather than at specific wavelength values. For example, when trying to compensate for the unevenness of optical gain profiles in laser cavities and optical amplifiers by means of an optical grating. However, achieving this requirement for a continuous range of wavelengths is difficult to meet with traditional grating technologies.

Similarly, a range of optical wavelengths may be used where many communication channels are encoded into a single optical cable by utilizing different wavelengths of light; more commonly known as Wavelength Division Multiplexing (WDM) technology. Periodic gratings are often used to separate or process these channels. However, periodic grating technologies process one wavelength, forcing devices intended to process multiple wavelengths to employ multiple single-wavelength periodic gratings. This is not an attractive solution because, on top of the additional losses that each grating creates, even a single grating occupies a considerable amount of space by today's standards of integration and miniaturization. It is thus desired to have a single device capable of processing several wavelengths in a space-efficient manner.

In the realm of semiconductor lasers, the output wavelength of semiconductor lasers is largely determined by the presence of "feedback elements" around, or inside the laser gain section, which act to reflect light at the desired wavelength back into the laser. For multi-wavelength operation, multi-wavelength feedback is needed. Again, single-wavelength grating technology can only address this demand with a cascade of simple gratings, leading to the same (if not more notable) loss and space problems mentioned above.

One such single-wavelength grating device, is a Bragg Grating. The Bragg Grating consists of a periodic variation in refractive index and acts as a reflector for a single wavelength of light related to the periodicity (known as pitch, A) of the index pattern; and is frequently used in both semiconductor systems and fiber-optic systems. In practice, however, the Bragg Grating can actually reflect at several wavelengths, corresponding to overtones of its fundamental pitch. However, these higher-order wavelengths tend to be at quite different spectral regions than the fundamental wavelength, thus making the Bragg Grating less than useful as a multi-wavelength reflector. Moreover, these higher-order wavelengths cannot be tuned independently of one another.

Other multi-wavelength grating technologies include: analog superimposed gratings, Sampled Gratings (SG), Super-Structure Gratings (SSG) and Binary Supergratings (BSG).

Analog superimposed gratings are a generalization of the Bragg Grating and are rooted in a principle of superposition: a grating profile consisting of the sum of the index profiles of single-wavelength gratings reflects at all of its constituent wavelengths. Such a grating relies on an analog index variation, that is, a refractive index that changes continuously along the grating length (FIG. 30). However, it is difficult to inscribe strong analog gratings using the well known photorefractive effect, since the change of index under illumination varies non-linearly, and generally saturates with stronger exposures. Likewise, rendering surface-relief analog gratings (a typical embodiment for semiconductors) is made impractical by the difficulty of reproducibly etching analog features into a surface. The latter difficulty brought about the introduction of binary gratings, i.e., gratings that rely only on two refractive index values corresponding to the material being etched or not etched, illuminated or not illuminated.

Two representations of multi-wavelength binary gratings are sampled gratings (SG) and superstructure gratings (SSG). The SG is constructed with alternating sections of grating and grating-free regions of the waveguide. The alternating sections produce diffraction spectra having multiple reflectance peaks contained within a (typically) symmetric envelope. The SG is intrinsically limited in the flexibility in the location and relative strength of reflectance peaks, and, because of the large fraction of grating-free space, is also spatially inefficient. The SG is therefore particularly unsuitable where a short grating is required or where waveguide losses are high.

With the super-structure grating (SSG), the grating period is chirped by finely varying the grating pitch, which corresponds to the length of one tooth-groove cycle. This can also be thought of as a sequence of finely tuned phase shifts; common phase profiles include linear and quadratic chirp. Such an implementation in principle allows arbitrary peak positions and relative heights, but only at the expense of extremely high resolution, corresponding to a very small fraction of the size of the grating teeth themselves.

Prior art regarding binary superimposed grating synthesis is presented in Ivan A. Avrutsky, Dave S. Ellis, Alex Tager, Hanan Anis, and Jimmy M. Xu, "Design of widely tunable semiconductor lasers and the concept of Binary Superimposed Gratings (BSG's)," IEEE J. Quantum Electron., vol. 34, pp. 729-740, 1998.

Other methods in the prior art address the synthesis of "multi-peak" gratings—i.e., gratings characterized by reflectance at several "peaks", which can be controlled in their position and strength. In these methods, a grating engineer begins with a set of sinusoids, each sinusoid corresponding to a single reflectance peak and weighted according to that peak's desired relative strength. These peaks are added together (i.e. superimposed; hence the BSG is known as a superimposed grating) to produce an "analog profile". This profile is then digitally quantized by a simple threshold method.

For example, if the analog profile value is positive (above a pre-selected reference) then the corresponding BSG segment is a high or binary 1 index value; if it is negative, the corresponding BSG segment is a low or binary zero index value.

However, this approach is inadequate in at least two areas: firstly, the threshold quantization process introduces intermodulation, which largely limits the applicability of BSGs synthesized in this manner to active applications (laser feedback elements and the like). Secondly, this synthesis procedure is limited to multi-peak gratings, and offers little or no control over the individual peak shape. For example, it is entirely incapable of generating flattop channels, as desired by some communication applications, or of generating the near-arbitrary reflectance spectra demanded by some gain-compensation and dispersion-compensation methods.

Other methods for BSG synthesis include trial-and-error methods that are most often computationally difficult and inefficient.

Therefore, it is desirable to provide a method and apparatus for overcoming the disadvantages noted above in designing and synthesizing supergratings for detecting optical wavelengths.

BRIEF DESCRIPTION OF THE DRAWINGS

The foregoing aspects and other features of the present invention are explained in the following description, taken in connection with the accompanying drawings, wherein:

FIG. 15 is a schematic of a demultiplexer employing a 1D BSG;

FIG. 16 is a schematic of a demultiplexer employing a 2D BSG;

FIG. 17 is a schematic of a static add/drop filter;

FIG. 22 is a schematic of a BSG dynamic WDM equalizer;

FIG. 23 is a schematic of a gain-flattened optical amplifier;

FIGS. 26a-26b are schematics of tunable dispersion compensators;

FIGS. 37-45 illustrate embodiments that employ a pattern of pixels that provides a photonic band gap structure

DETAILED DESCRIPTION OF THE PREFERRED EMBODIMENT

Figure 1:
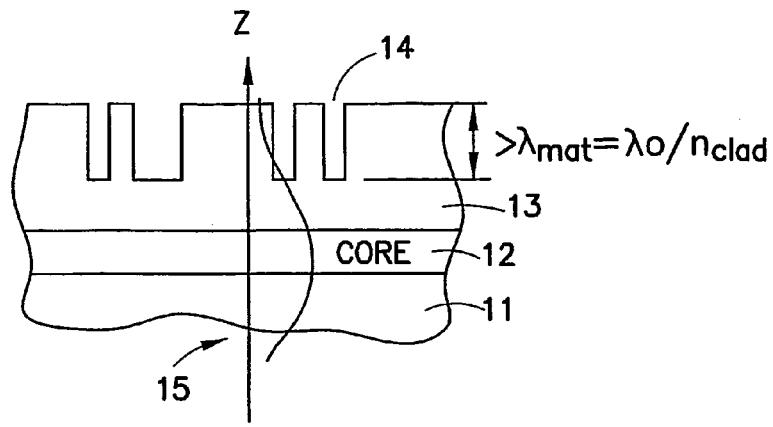
FIG. 1 is a schematic of deep-grating BSG.

Although the present invention will be described with reference to the embodiments shown in the drawings, it should be understood that the present invention can be embodied in many alternate forms of embodiments, and it is not intended that this invention is limited only to the embodiments shown.

For the purposes of this invention, gratings are considered to be optical devices used to achieve wavelength-dependent characteristics by means of optical interference effects.

Starting with Binary Supergratings (BSG), it will be appreciated that there are two main properties that differentiate the BSG from other grating technologies. The first is that the BSG relies on a discrete number of refractive index levels. This number is historically 2 and hence the BSG is known as a binary grating. For the sake of clarity and illustration this description will focus on the binary embodiment of the present invention, however, it will be appreciated that in alternate embodiments any suitable number of discrete levels of refractive index may be used. For convenience in the claims, the term supergrating will be used to refer to gratings with two or more values of index of refraction, unless specifically stated. The second defining property of the BSG is that the grating resembles a sampled structure characterized by a sample length. This refers to the fact that transitions between the grating's index levels cannot occur at arbitrary positions but, rather, occur at multiples of the sample length. The BSG is thus similar in definition to a digital signal pattern—i.e., a discrete sampled waveform. Thus, the BSG can be described by a series of (often binary) digits, indicating the refractive index setting at each sample point (see FIG. 31).

Figure 35:
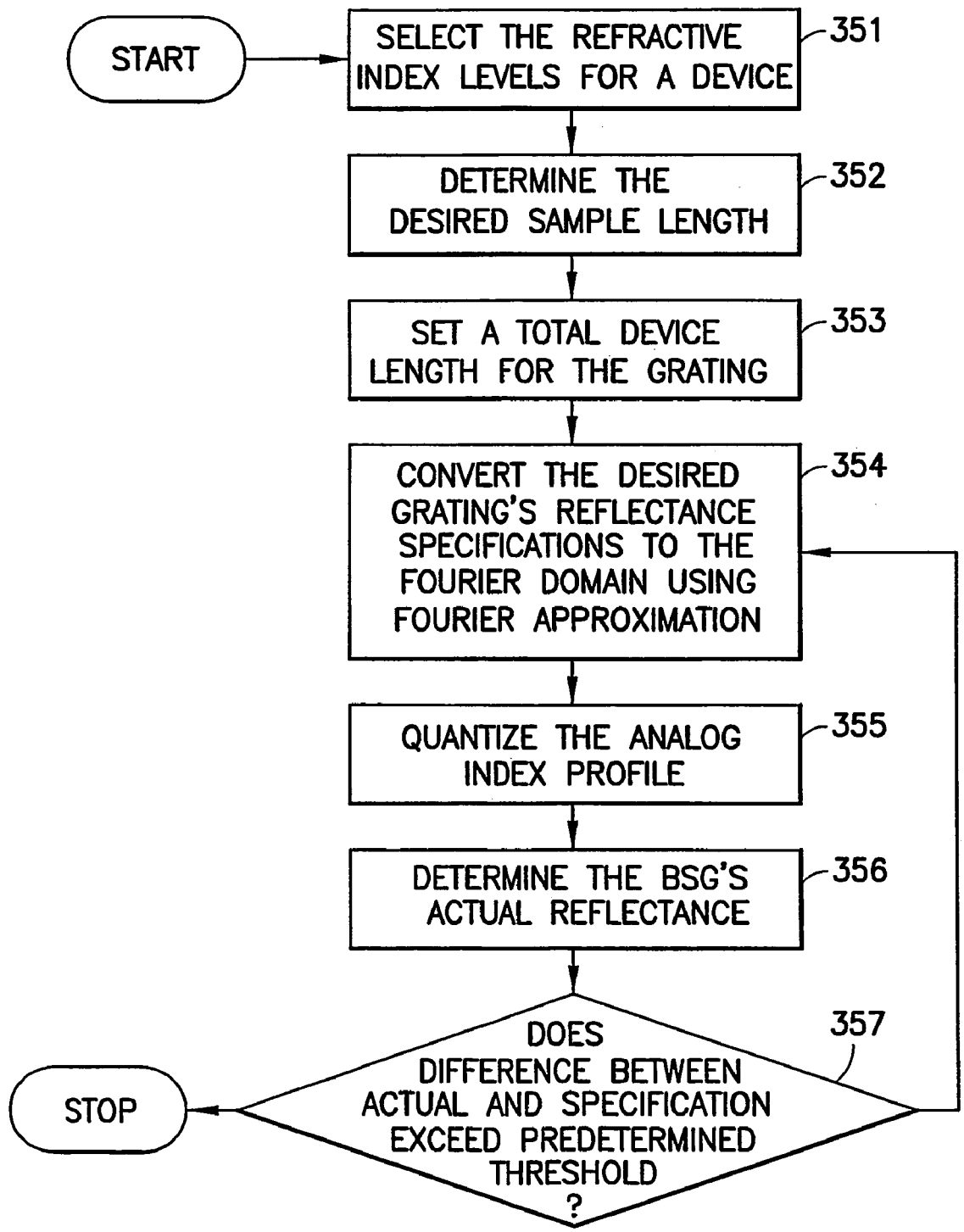
FIG. 35 is a flow chart showing method steps of one embodiment of the present invention for synthesizing a BSG.

Referring now to FIG. 35, BSG design involves several key choices. Step 351 selects the refractive index levels for the device, as determined from material parameters and lithographic or photoinscription constraints. Step 352 then determines the desired sample length, considering the desired wavelength range for the grating and the available lithographic resolution. Step 353 sets a total device length for the grating, limited by the available physical space and the technological limitations of the inscribing process. It will be appreciated that the methods described herein are for determining grating patterns for surface-relief gratings; however, in alternate embodiments the methods may be readily adapted to fiber grating patterns, or to programmable implementations. The next step 354 converts the desired grating's diffraction characteristics to the Fourier domain using a Fourier approximation. These diffraction characteristics can be reflective, transmissive, co- or counter-directional coupling, or scattering in character, or any combination thereof; it will be appreciated that "reflectance" and "reflection" can be replaced by "cross-transmittance" and "cross-transmission" throughout this document. Guided by the Fourier approximation, the designer can initially design the grating by its Fourier spectrum. As will be shown below, this step can also implement feedback to account for various inaccuracies of the approximation in order to improve the final result. Alternatively, any method for the design of an analog refractive index profile to achieve the desired diffractive characteristics is suitable, and many are known in the art.

The next step 355 performs a quantization of the analog index profile. Delta-Sigma modulation is one such quantization technique that can be used and can be efficiently implemented. It will be appreciated that in alternate embodiments any suitable quantization technique that conserves Fourier information within a spectral band may be used. Methods of synthesis and resultant gratings that use a threshold quantization technique such as that shown in the cited reference by Avrutsky, et al., which does not conserve Fourier information within a spectral band are disfavored, but may be useful in some circumstances. In the case of two dimensional or three dimensional radiation processing, where radiation traveling in two or three dimensions is significant, and a pixel array extending in two or three dimensions is significant, any quantization method may be used to design an apparatus that falls within the definition.

The next step 356 determines the BSG's actual diffractive characteristics using an exact technique such as one known as the transfer matrix method. This calculation determines residual errors of the Fourier approximation, or other synthesis method used, and quantifies an error that can be taken back into the Fourier domain and added to the result of the step 353 if step 357 determines that the error exceeds a predetermined threshold. This process can be repeated as necessary, although one repetition is often sufficient. It will be appreciated that any suitable technique for determining error between the desired diffractive characteristics and actual diffractive characteristics may be used.

Referring now to each of the above steps in more detail; in step 353, the Fourier approximation is a mathematical relation that relates a grating's diffraction characteristics (which can be reflective, transmissive, or scattering in character, or any combination thereof), to the structure of its index profile. In other words, single-wavelength gratings have reflectance spectra characterized precisely by their periodic structure, and simple superimposed gratings have reflectance spectra characterized by their wavelength or reflectance spectra components. Therefore, the diffraction spectrum of a grating can be related to the Fourier transform of its structure—the Fourier transform being the standard method for evaluating the "frequency content" or "wavelength content" of a waveform.

Thus, it will be appreciated that the invention advantageously uses a Fourier approximation to provide a means (the inverse Fourier transform) for generating an analog refractive index profile from the desired reflectance specifications.

It will also be appreciated that the step of quantizing the analog index profile (step 355) can be performed regardless of how the analog profile was determined. In other words, the analog profile need not have been obtained using Fourier-based methods.

The following examples illustrate Fourier Approximation for BSG synthesis:

Synthesis of Simple Peaks

In some situations, such as with laser feedback elements, the BSG is desired to reflect light at a given set of wavelengths, and to do so with the highest wavelength selectivity possible. That is, the specification is for simple peaks with minimal channel width. Such peaks can be derived from the superposition of sinusoidal profiles:

$$\sum_i a_i \cos(\omega_i x + \phi_i)$$

where $a_i$, $\omega_i$, and $\phi_i$ are the amplitude, spatial frequency and phase of the $i^{th}$ peak respectively, and x is the position along the grating's length. Most situations dictate the amplitude coefficients. However, many do not require anything specific of the phase.

In general, component phases should be selected such that they minimize the maximum height of the superposition (which consequently flattens the overall envelope), given the component amplitudes. The use of phase information to produce a flat envelope can greatly increase the efficiency of the grating. This illustrates a general principle of BSG design: in most cases, the analog index profile (before quantization) should preferably have an envelope that is as flat as possible. This is desirable because a flat envelope represents an even distribution of grating strength, and makes more efficient use of the available index modulation.

The phase optimization step in accordance with this invention facilitates large increases in a BSG's reflective efficiency. It will be appreciated that increasing the number of reflective peaks produces a sub-linear increase in the required index modulation. That is, in order to double the number of peaks, but maintain the same peak reflectance, the index step does not need to be doubled.

Synthesis of Bandpass Channels

A grating is often required to separate or select wavelength division multiplexed optical communication channels. These channels are described by their wavelength (position) and their bandwidth (width). Gratings are also typically accompanied by specifications of the strength of the reflection and the spectral flatness of the channel. Such bandpass filter design is commonly encountered in FIR filter theory, and thus many approaches to its solution exist. The technique presented here is based on the method of windowing.

The main principle in the synthesis of structured grating spectra, such as the bandpass filter, is the use of analytically determined solutions to an approximated design problem: certain filter shapes, such as the flat-top filter, are known to correspond to certain mathematical functions. For example, it is known that the sinc function with the form:

$$\frac{\delta\omega}{\pi}\text{sinc}(\delta\omega i) = \frac{\sin(\delta\omega i)}{\pi i}$$

where i is the BSG segment number, corresponds to an ideal lowpass filter of width $\delta\omega$. This filter can be converted into a bandpass filter centered about the frequency $\omega_c$ by multiplying it with an appropriate sinusoid, resulting in the filter:

$$\frac{\Delta\omega}{\pi}\cos(\omega_c i)\text{sinc}\left(\frac{\Delta\omega}{2}i\right)$$

where the peak is centered about $\omega_c$ and has a width of $\Delta\omega$.

Unfortunately, this filter, characterized by an abrupt transition from the passband to the stopband, requires an infinite length for its implementation. Simply cropping the filter to the desired length produces undesirable oscillatory features known as Gibbs phenomena. This is a common issue in FIR design, and one approach to its solution is the method of windowing.

The method of windowing views cropping as a multiplication by a window function that is zero in the cropped regions. Theory views the cropping operation as multiplication by a "rectangular window" which equals 1 within the region to be kept, and 0 outside in the sections to be cropped. The theory argues that this rectangular window is responsible for the Gibbs phenomena.

Window functions that can be used for cropping generally make the bandpass filter non-ideal by producing a finite "transition width" between the passband and the stopband, in contrast to the ideal filter, which requires no width for the transition. However, FIR filter theory suggests several acceptable albeit non-ideal, window functions.

One such window function is the Kaiser window—a window function conceived with the ideal lowpass (and thus bandpass) filter in mind, and which allows the designer to customize the transition characteristics through a parameter $\beta$. The Kaiser window is thus suitable for BSG synthesis and provides the added flexibility of controlling the shape and sharpness of the reflectance channels. However, this is only one of many FIR techniques that can be used to achieve this result, and BSG synthesis by Fourier methods is not restricted to this particular method.

It will be appreciated that the analog profile corresponding to a flattop channel makes most use of the center of the grating. As with the multi-peak case, this situation is undesirable as it makes inefficient use of grating resources away from the center. A convenient solution to this problem is to stagger the waveforms associated with individual channels-when superimposing them. Together with a phase-optimization technique such as that used for the multi-peak grating, this procedure can enable very efficient use of the grating's resources.

In some embodiments the reflectance specifications do not correspond to particular elementary shapes such as band pass channels or peaks. Gain compensation profiles for optical amplifiers and dispersion-compensation gratings fall into this category. In these embodiments, gratings may be synthesized using the discrete Fourier transform (DFT).

The discrete Fourier transforms and the related fast Fourier transform (FFT) are versions of the Fourier transform that operate on a finite number of sampled points. Being related to the regular Fourier transform, the Fourier approximation and its implications on BSG synthesis carry over to the DFT. A DFT operating on a set of l real-valued points returns a set of ½ independent frequency components. Thus, a desired grating with l segments may be assigned reflectance values at ½ wavelengths, but not between wavelengths.

An example of BSG synthesis using the DFT is carried out as follows:

The frequency-domain specifications are inserted into an array of length l, the intended device length (in terms of number of samples), in a manner suitable for the inverse-DFT operation. This can be done by "sampling" the continuous version of the Fourier-domain specifications at certain points, or, alternatively, by "drawing" the specification directly in the form suitable for the DFT. The inverse-DFT of the array is then determined. Various known forms of "smoothing" can be applied to the resulting waveform in order to reduce oscillatory features between the frequency samples.

Once the analog index profile has been synthesized, it may require several modifications. One such modification is filtering by a discrete-sum filter. Another modification is that the waveform should be scaled to a level appropriate to the upcoming Delta-Sigma modulation stage. For example, this can be accomplished by rescaling the waveform to have an amplitude of 1.

Quantizing or Delta-Sigma Modulation (DSM)

The Fourier domain synthesis presented up to now produces an analog grating profile. However, the BSG requires a discrete profile utilizing only a small number (usually two) of index values. It will be appreciated that in alternate embodiments any suitable number of discrete values can be used, such as for example, an Octal Super Grating (OSG). One technique for the quantization (i.e., discrete rendering) of the grating profile is Delta-Sigma modulation. However, any suitable quantization techniques can be used.

A preferable requirement for the quantization of the analog profile by Fourier methods is that it conserves spectral information in the frequency band of importance. Delta-Sigma modulation, for example, is designed to "filter out" quantization noise from a given frequency band, leaving the spectral information in that band mostly undisturbed. Other quantization methods can also be applied, with improvements, such as an accounting for grating effects that are not evident in the frequency domain. In any case, the selected quantization method preferably conserves small-amplitude spectral features in the band of importance, as required by the Fourier approximation, which becomes exact in the small-amplitude domain.

It will be appreciated that the method of BSG synthesis by Fourier techniques and the following quantization presented here are not restricted to Delta-Sigma quantization.

Figure 32:
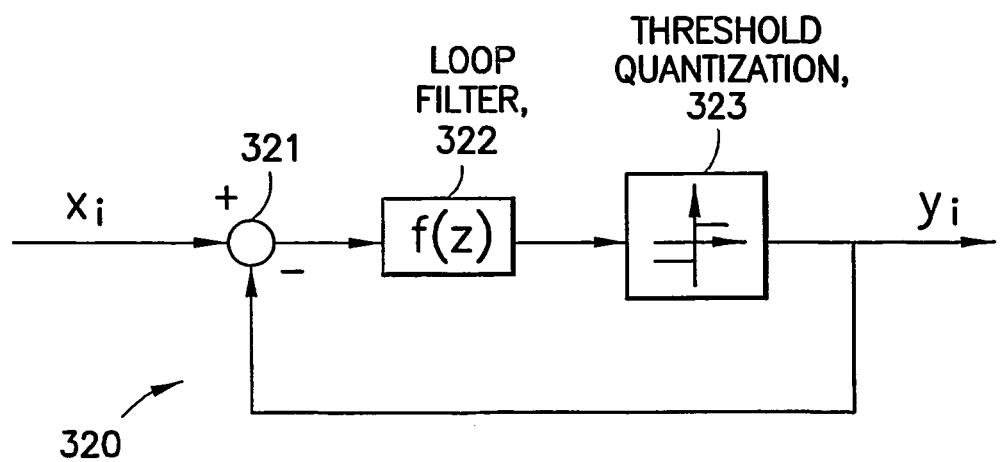
FIG. 32 is a block diagram showing a standard topology for Delta-Sigma modulation.

Referring to FIG. 32, there is shown a DSM feedback process 320 that improves quantization after a loop filter 322 by making use of the measured quantization error 321. That is, DSM quantizes its input using a threshold in unit 323, but keeps track of any important information that is lost by the quantization in unit 323 and feeds this information back into its input in filter 322. It will be appreciated that in alternate embodiments any suitable digital quantizer can be used.

Error Feedback and Iteration

Once the Fourier grating reflectance spectra has been quantized, the synthesis is almost complete. The grating's performance can be evaluated using a standard test such as the transfer matrix method to determine synthesis error. Synthesis error refers to the difference between the desired reflectance spectrum and the spectrum measured by the transfer matrix method. In one embodiment, the error may be evaluated and used to offset the design specifications by subtracting the error from the grating's frequency-domain specifications. The new specifications can then be used to repeat the synthesis process and generate an improved grating. In an alternate embodiment, the error, which is measured in the frequency domain, can be appropriately transformed into the spatial domain and added to the analog grating profile (the grating before quantization). This latter form is a general and powerful technique that can be utilized independently of the synthesis method used in the frequency domain. The error feedback process can be repeated as desired, but a single iteration is often sufficient. The convergence of the feedback process for small-amplitude frequency regions is guaranteed by the Fourier approximation described above.

It will be appreciated that the present invention advantageously allows a designer to compare error feedback correction with grating correction techniques in order to correct for distortions in the diffraction-characteristics domain. For example, certain peaks may have characteristic shapes to which they distort in the reflectance domain, for which either the above described error feedback may correct. The present invention allows the designer to weigh the advantages of error feedback as compared with application of grating resources.

Alternate Embodiments of BSG Synthesis

Induced-Symmetry Synthesis

Figure 33:
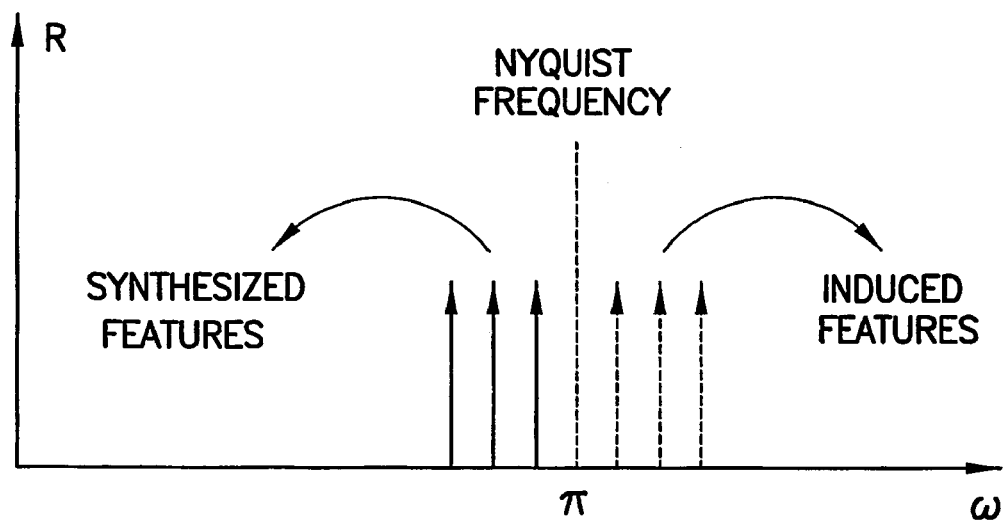
FIG. 33 illustrates a synthesis technique for a BSG using induced-symmetry.

Referring to FIG. 33, an elementary property of sampled signals is that their Fourier spectrum displays a symmetry about integer multiples of a characteristic frequency known as the Nyquist frequency. In certain applications, such as filters with large numbers of identical peaks, a similar symmetry exists in the reflectance specification. The principle of Induced-Symmetry Synthesis is that the symmetry of the reflectance specifications can be reproduced by the symmetry about the Nyquist frequency, such that the grating's resources need only be used to create one half of the spectral features.

A good example for this method is the synthesis of a filter with ten equally spaced reflectance peaks. Using the principle of Induced-Symmetry Synthesis, the designer can choose a sampling length that places the Nyquist frequency precisely in the middle of the ten peaks, that is, on the line of symmetry of the specifications. The designer can then proceed to synthesize a grating for the five lower peaks. The upper five peaks appear automatically due to the Frequency-domain symmetry.

Super-Nyquist Synthesis

Often the required resolution for grating-inscription exceeds the available resolution. For example, when designing a BSG for the 1550 nm wavelength range in Gallium-Arsenide (n=3.2), it is convenient to place the Nyquist rate at 1550 nm (to make use of Induced-Symmetry Synthesis, for example), which corresponds to a sample length of about 120 nm. This feature size is too small for optical photolithography, and requires the use of the more expensive electron-beam lithography.

However, Nyquist states that the frequency content above the Nyquist limit consists of repeated copies, known as images, of the spectral information below the Nyquist limit. Thus, grating features above the Nyquist rate (Super-Nyquist) may be generated by synthesizing their grating image that are found below the Nyquist limit.

Figure 34:
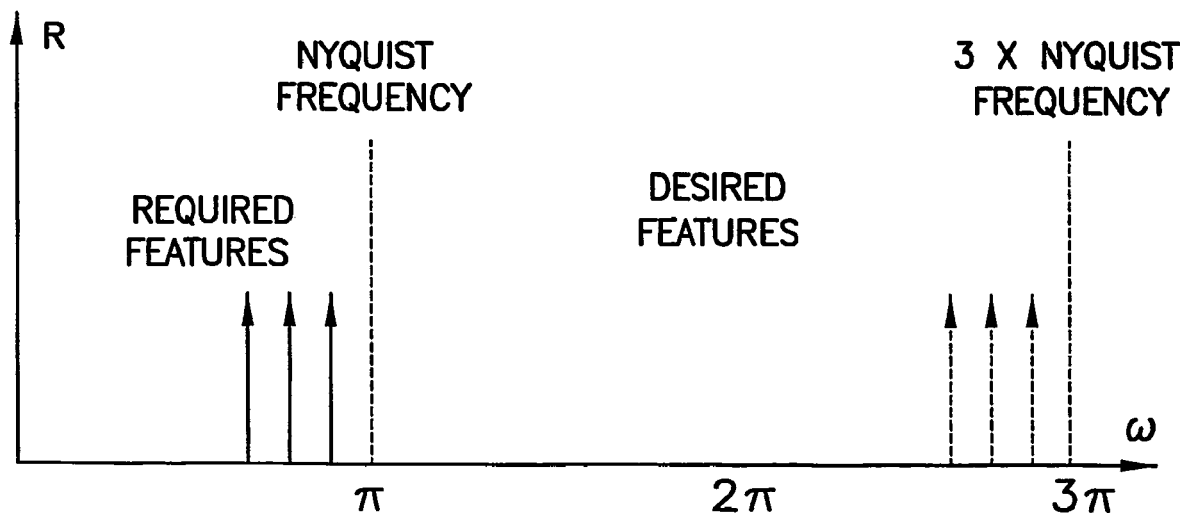
FIG. 34 illustrates a synthesis technique for a BSG using super-Nyquist synthesis.

In this manner, Super-Nyquist Synthesis is useful, for example, for reducing the resolution required for the 1550 nm Gallium-Arsenide grating discussed above. Choosing "third order" synthesis, the designer can select the sample length such that the 1550 nm region corresponds to three times the Nyquist frequency, as indicated in FIG. 34. The designer can then shift the Fourier domain grating characteristics by integer multiples of the sampling rate (twice the Nyquist frequency), such that they are in the "baseband", below the Nyquist frequency. A grating synthesized for these shifted characteristics displays grating characteristics where intended, just below three times the Nyquist frequency, due to the phenomenon of imaging. Furthermore, the sample length for this new grating is 360 nm, which is more appropriate for optical lithography. It will be appreciated that applying Super-Nyquist Synthesis advantageously reduces the resolution requirements.

Super Grating Applications

Supergrating Scattering Reduction

Referring to FIG. 1 there is shown a schematic of a deep-grating BSG 14 formed in upper cladding 13 that combines with core 12 and lower cladding 11 to form the structure. A concern in supergrating design is scattering losses due to radiative cladding modes, arising from low spatial-frequency components in the grating. This scattering arises from an incomplete enforcement of phase-matching conditions in the direction normal to the grating, and is more prevalent with shallow gratings.

Deeper etched features of the present invention reduce this scattering by occupying a greater distance in the normal direction, which from the well known Huygens principle and Fourier considerations, leads to a more robust phase-matching requirement in the normal dimension; thereby reducing (unwanted) scattering efficiency. More quantitatively, grating features should ideally be deep-toothed to a depth exceeding the material wavelength in the cladding ($\lambda_{mat}=\lambda_0/n_{clad}$), and the decay constant of the modal tail should be less than $1/\lambda_{mat}$ in the grating region (alternatively, the BSG can be implemented in the core region 12 at the mode's center, in which case the core 12 should be wider than $\lambda_{mat}$; or in such a way that the index perturbation spans the entire modal profile). This ensures relatively even contributions from the normal extent of the grating, thereby enhancing cancellation of the scattered component.

The analysis follows by considering the product of the index profile and modal profile 15: the wider and flatter this product is, the narrower its Fourier transform, and hence the narrower the k-space representation in the normal direction. This increased restriction on the phase-matching condition decreases the range (for example, in terms of output angle) over which a guided wave can couple to radiative modes, and hence reduces the aggregate scattering loss.

Figure 2:
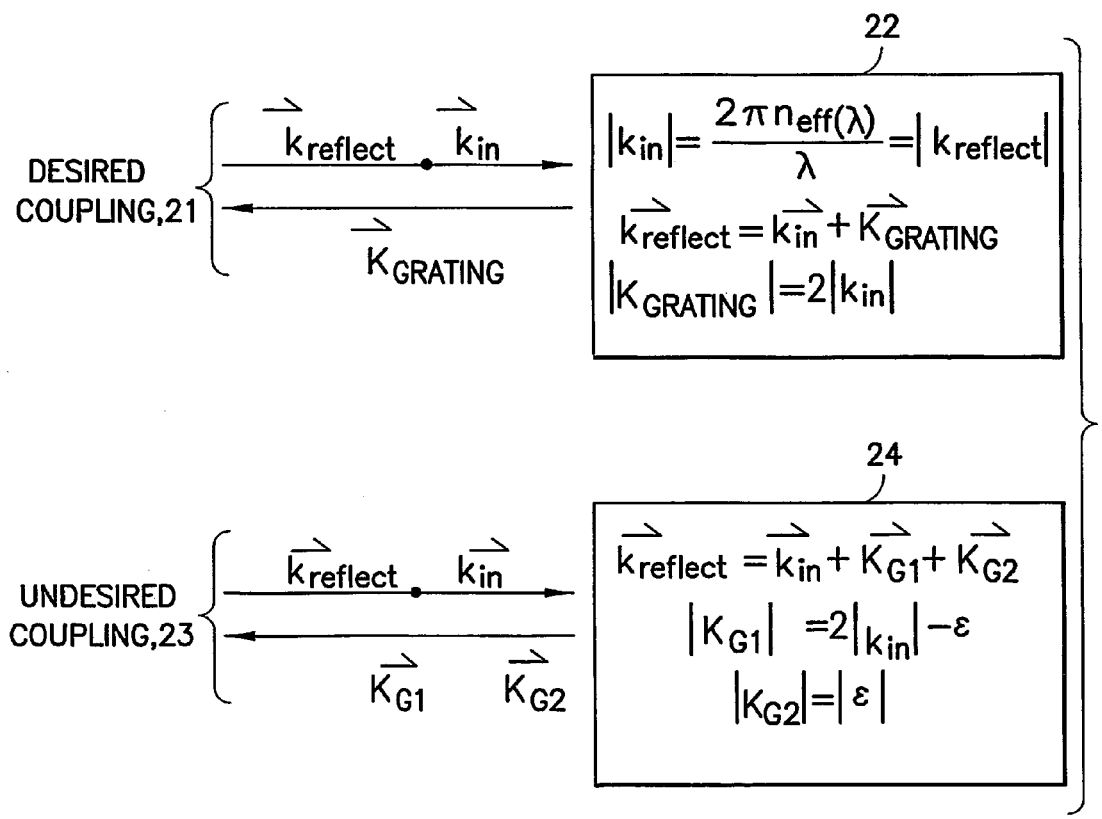
FIG. 2 is a k-space picture of rationale behind baseband exclusion.

Referring also to FIG. 2 there is shown a k-space illustration of the rationale behind baseband exclusion. Including the k-space baseband (i.e. low spatial frequencies) as an additional "region of interest" improves synthesis by drastically reducing the unwanted higher-order coupling mediated by small-k components.

Figure 3:
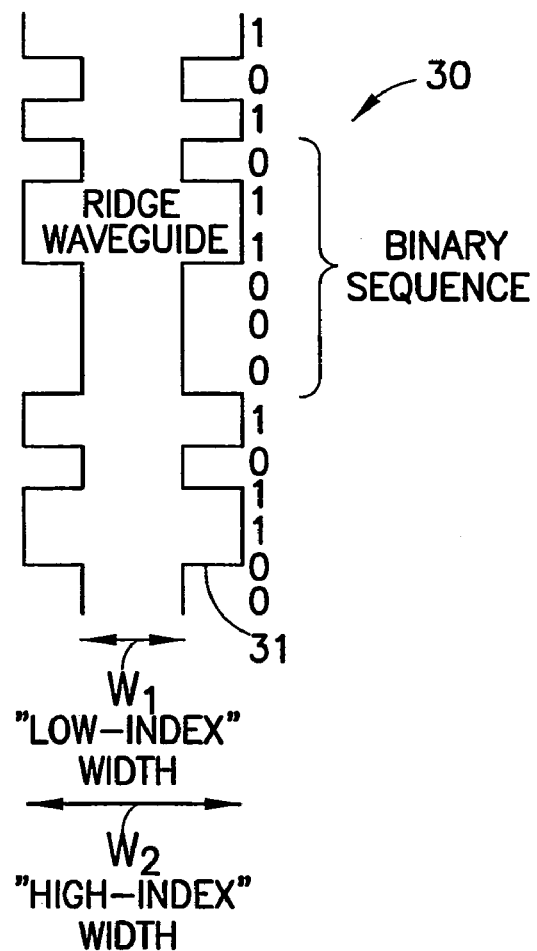
FIG. 3 is a prototypical diagram of a lateral BSG in a ridge waveguide.
Figure 31:
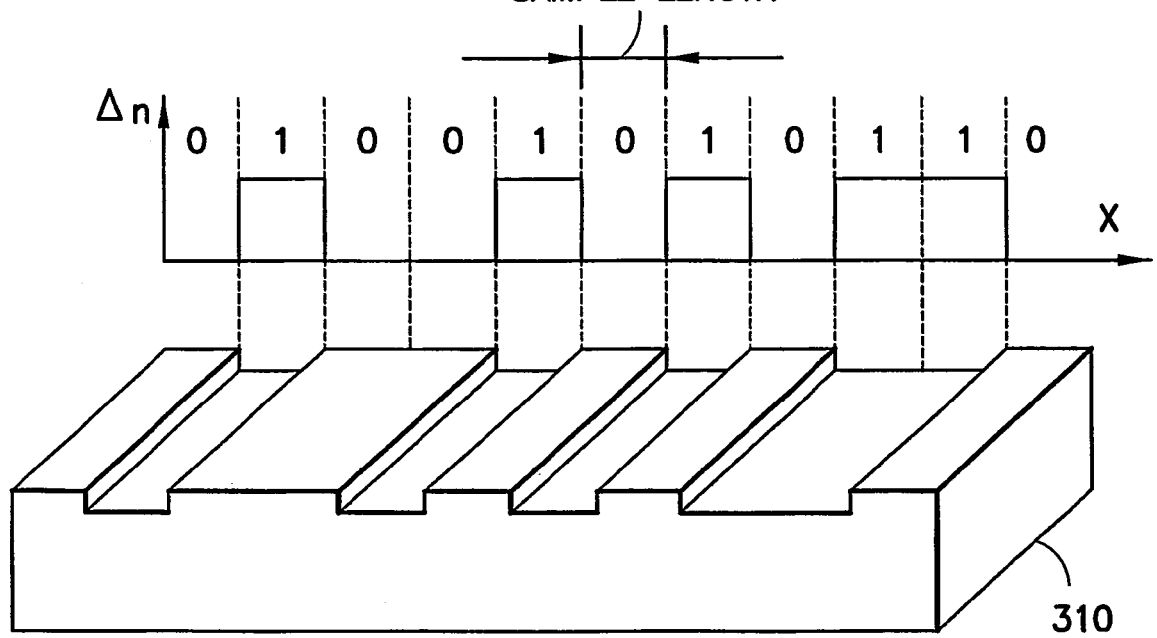
FIG. 31 shows a BSG index profile of $\Delta n$ versus distance x and the corresponding surface-relief implementation.

In alternate embodiments, supergratings may be implemented using any means of varying the effective (or modal) refractive index, including a surface relief embodiment (see FIG. 31). One alternative is to effect changes in modal index by varying the lateral dimension(s) of a one-dimensional waveguide. This can be accomplished in the case of a ridge waveguide 30 by varying its width, as shown in FIG. 3 from a logic zero to a logic one value. This embodiment possesses many advantages: the waveguide 30 and BSG 31 can be patterned and etched together, thereby simplifying fabrication; the waveguide and grating are automatically self-aligned, easing tolerances; and grating multi-level supergratings can be produced as easily as two-level BSGs.

2D (Two-dimensional) Supergratings

In one embodiment, the BSG takes the form of a one-dimensional sequence of high-index and low-index lines, and can emulate the near-arbitrary superposition of k-vectors (i.e. spatial frequency components) of differing magnitude but like orientation. The BSG can be extended to two dimensions, where it takes the form of a matrix of high- and low-index pixels implemented in the plane of a planar waveguide; this can be further extended to include any number of discrete levels. The 2D BSG (and the more general 2D supergrating) can emulate the near-arbitrary superposition of k-vectors of differing magnitude and differing orientation (within the plane of the grating). In practical terms, this means that the 2D BSG can route and focus light according to wavelength and in-plane input and output angles, thereby permitting functionalities such as beam-shaping, wavelength-selective lensing, and spatial multiplexing and demultiplexing.

2D Supergratings Embodiments

Figure 4:
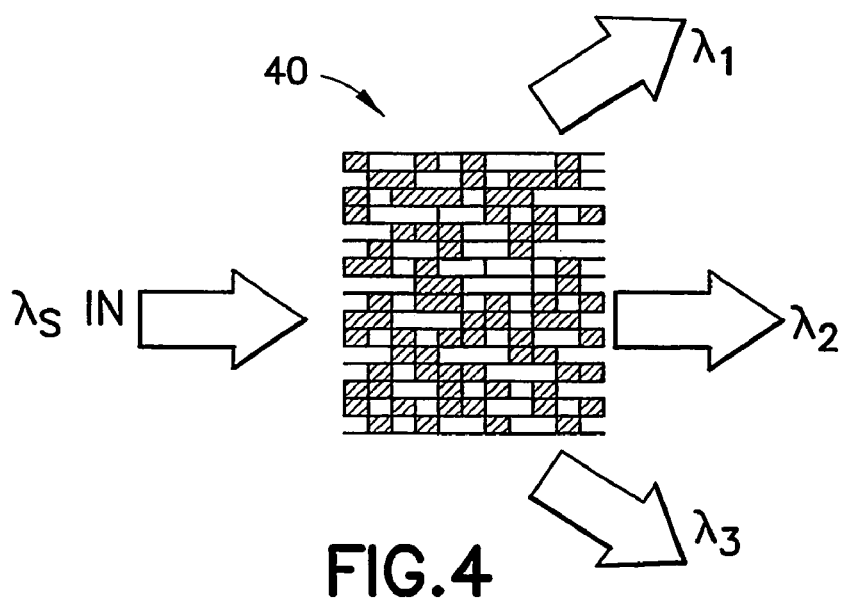
FIG. 4 is a schematic of a prototypical two dimensional (2D) supergrating.

Referring now to FIG. 4 there is shown a schematic of a prototypical 2D "supergrating" 40, referred to as a BSG, standing for binary supergrating. A 2D supergrating is an optical device having a 2-dimensional array of index-modulated, effective-index-modulated, gain-modulated and/or loss-modulated pixels nominally employing a finite set of two or more levels of the modulated parameter or parameters, and used in such a way that light propagates in the plane of the array. The term "propagation layer" will be used in referring to the layer through which the light travels. The term "modulation layer" will be used to refer to the layer carrying the physical change that causes the change in the modal index of refraction of the structure. In some cases, the two layers will be the same—e.g. when ion implantation is used. In other cases, they will be different as when a cladding layer is etched or when a controllable finger is applied to make contact with the propagation layer. Those skilled in the art will readily be able to understand when the terms are used. The pixels can be arranged in any ordered or periodic structure, e.g. a lattice arrangement, and can employ any arbitrary but repeating shape. Shaded pixels indicate a high index value and blank pixels indicate a low index value. Examples are arrays of rectangular pixels on a rectangular array, point scatterers in a triangular mesh, or hexagonal pixels in a hexagonal mesh.

The manufactured form of this device can exhibit non-binary or even a continuum of modulation levels due to the technical difficulties associated with producing a perfect physical structure, but the pixels are nonetheless inscribed with a finite set of inscription methods or parameters corresponding to the ideal set of levels that makes the device a 2D BSG. Such a device can allow angle- and wavelength-specific optical processing, in addition to emulating traditional optical components such as mirrors and lenses.

The pixels of a 2D BSG are the quantized representation of an analog profile that has been quantized by a method that preserves Fourier information (neither adding or subtracting features significantly) in one or more regions of interest in the two-dimensional spatial frequency representation of the grating, that correspond to regions of interest in terms of angle and wavelength-specific diffraction characteristics.

Synthesis of 2D Supergratings

One method of synthesizing two-dimensional supergratings may be as follows:

A) Determine a set of mathematical conditions that describe the electromagnetic fields at the inputs and outputs of the BSG in all modes of operations and wavelengths.

B) Compute an analog profile by solving a system of equations corresponding, say, to the Born approximation with boundary conditions corresponding to the input-output conditions.

C) Digitize the analog profile using a two-dimensional technique designed to maintain Fourier components within one or more regions of interest. One suitable method is Floyd-Steinberg dithering, where the quantization error made at each pixel is spread to the yet-to-be-quantized pixels using a finite impulse response function containing spectral information in the region(s) of interest.

Figure 36B:
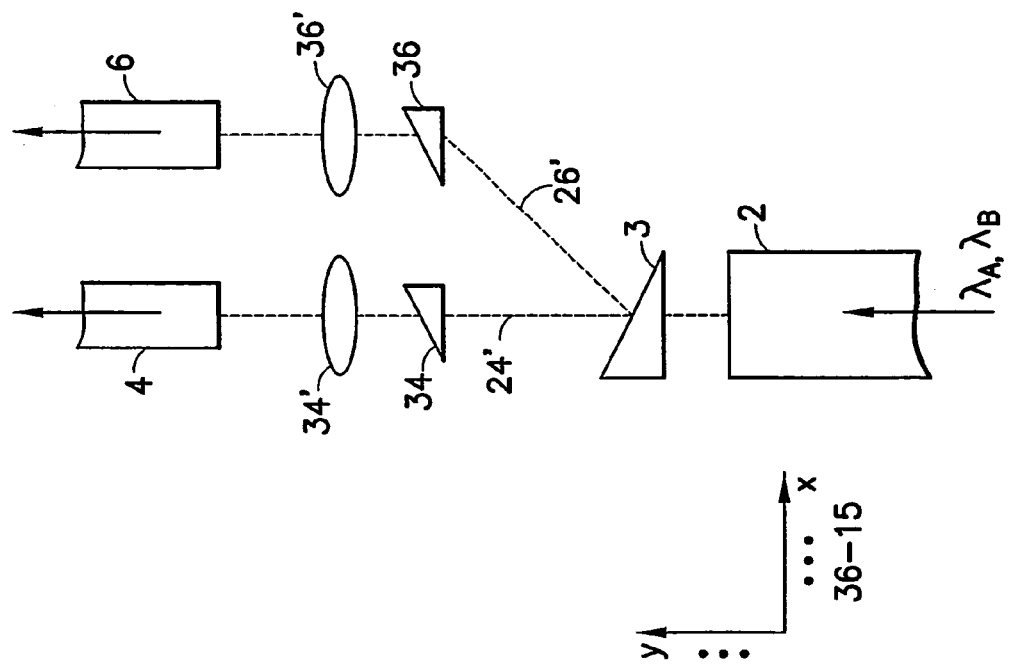
FIGS. 36a and 36b illustrate a simplified example of a demultiplexer comared with discrete components.
Figure 36A:
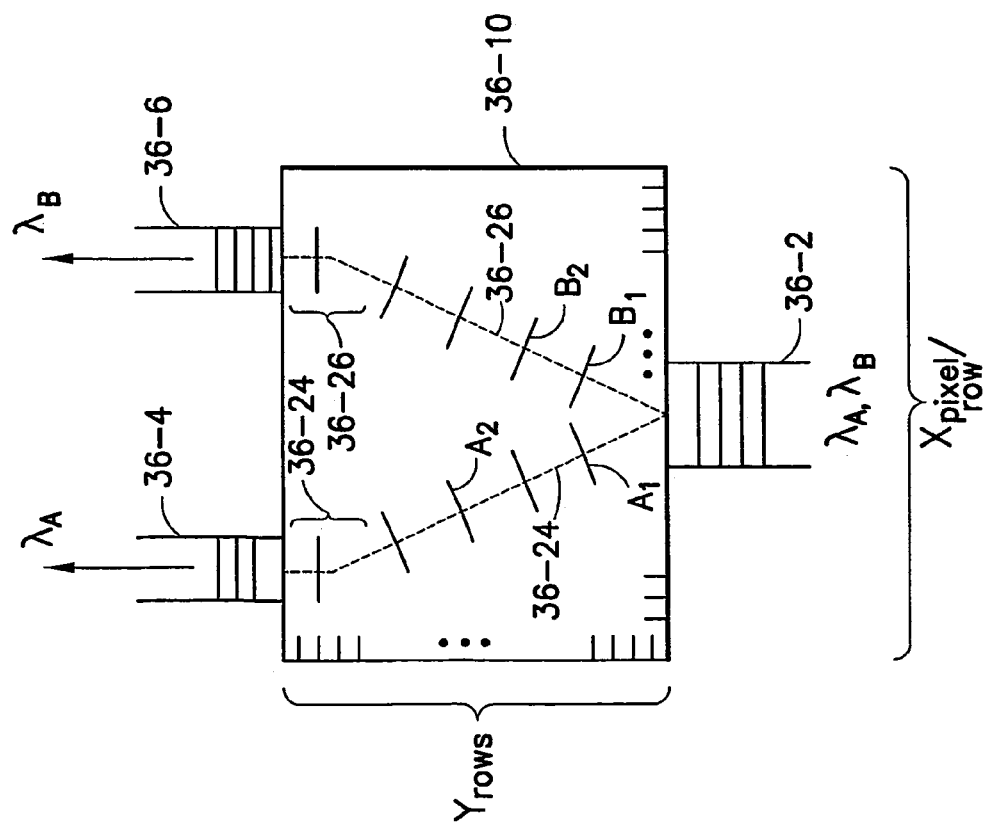

The process of grating synthesis may be illustrated with reference to a simplified example. FIG. 36A shows a simple demultiplexer 36-10 for separating radiation coming in from below on waveguide 36-2 and having two wavelengths La and Lb into two outgoing paths 36-4 and 36-6, each having a single wavelength. FIG. 36B shows a simple demultiplexer using discrete components that performs the same function. The example of FIG. 36B uses a prism 3 to separate the incoming wavelengths along two paths 24' and 26' (both beams being bent in the same direction). The separated radiation beams are bent back into the correct path to enter the outgoing waveguides 4 and 6 by prisms 34 and 36. The beams are then focused into the waveguides 4 and 6 by lenses 34' and 36'.

FIG. 36A shows the same functions being carried out by an embodiment formed in a planar waveguide by solid-state techniques. An X-Y (directions indicated by axis 36-15) array of pixels, denoted by lines along the left edge and bottom of box 36-10 form a BSG that perform the functions of separating the beams (in this case bending one wavelength to the left and the other to the right) at angles that vary with distance (angles A1 and A2 and B1 and B2) to provide separation. The angles are reversed in the region denoted by brackets 36-34 and 36-36, where the pixels perform the angular change and also focus the radiation. At the lower portion of box 36-10, the wavefronts are indicated by straight lines and at the upper portion, denoted by curved lines representing the result of focusing into the outgoing waveguides 36-4 and 36-6.

It will be appreciated that the example of FIG. 36A is simplified in that the pixels in the upper portion only process a single wavelength, since the radiation has been separated in space. In many actual embodiments of a demultiplexer, the outgoing paths will be close or superimposed and the pixels will be processing more than one wavelength. It is an advantageous feature of the invention that the synthesis of a refractive index profile to carry out the required functions is performed mathematically, rather than by illuminating a layer of material by a first interference pattern, then a second pattern, etc., as in the past.

Figure 5:
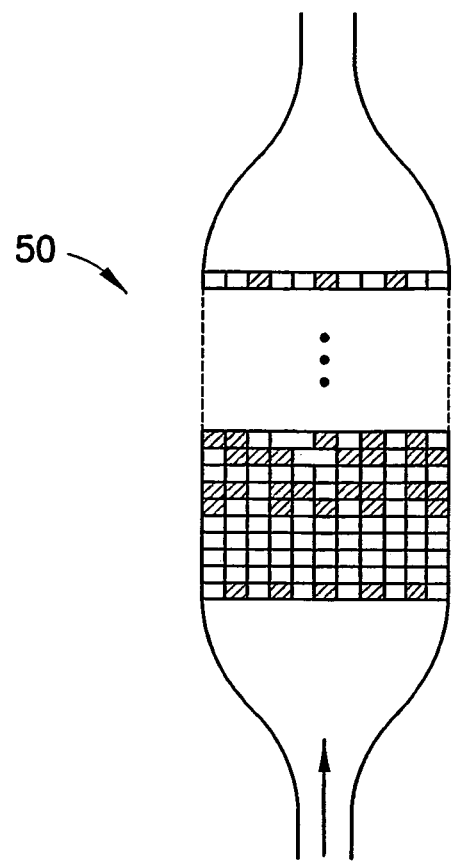
FIG. 5 is a schematic of a multi-level one-dimensional (1D) supergrating implemented with a 2D BSG.

Referring to FIG. 5, a 2D BSG can be used in applications and devices that use 1D supergratings 50 or other types of gratings in order to provide potential advantages. These advantages stem from the fact that the two-dimensional grating has well-defined coupling wave vectors in both dimensions of the grating plane, and hence offers direct control over coupling with radiative modes and, therefore, the potential for reduced scattering. The 1D grating 50, in contrast, often has coupling wave vectors that are poorly defined in the direction perpendicular to the waveguide, due to its narrow width.

The "effective one-dimensional grating" corresponding to a given two-dimensional grating can be thought of as the 1D index profile derived by integrating the 2D grating along lateral lines perpendicular to the 1-dimensional guiding. This effective 1D grating has index levels that span a wide range of values between the two binary levels, and with sufficiently high lateral sampling can be almost analog in character (the number of levels will be $2^l$ for 1 binary lateral samples). As analog gratings do not suffer from quantization problems, this can be used as a method for a multi-level grating design that still enjoys the robustness and eased fabrication benefits of a binary-like physical structure.

The method can be summarized as including the following steps:

Compute an analog profile as with the prior method.

Convert each pixel into a line of binary (or multi-level) pixels, placed in the lateral direction perpendicular to the 1D grating axis in such a way that the average taken along that line closely fits the desired analog value. This set of pixels is preferably constrained to maintain certain symmetry properties in order to reduce coupling to higher modes (with the tradeoff of limiting the number of available lateral averages). This line can be computed using a DSM-like process (fed with the desired averaged value or with a desired lateral profile); with a random-search optimization method (for small numbers of pixels); or by other methods.

The 2D supergrating can be implemented in a 1-dimensional configuration by first sufficiently widening the 1D waveguide to contain the 2D supergrating. The waveguide can extend beyond the area and there contract to a smaller (possibly single-mode) size. Additionally, two waveguides can expand into such a 2D grating area (and similarly contract on the other side) to create waveguide couplers. 2D supergratings also offer reduced scattering when implemented in conjunction with supergrating waveguide couplers.

3D (Three-dimensional) Supergratings

The BSG can be further extended to three dimensions, where it takes the form of a three-dimensional array of high- and low-index pixels. As before, this definition can be expanded to include any number of discrete levels. The 3D BSG (and the more general 3D supergrating) can emulate the near-arbitrary superposition of k-vectors (i.e. spatial frequency components) of any magnitude and orientation within one or more regions of interest defined in 3D spatial-frequency space. In practical terms, this means that the 3D BSG can route and focus light according to wavelength, input angles (i.e. polar and azimuthal), and output angles, thereby permitting functionalities such as those described for two-dimensional gratings, but in the three dimensions of wavelength, polar angle, and azimuthal angle.

Figure 6:
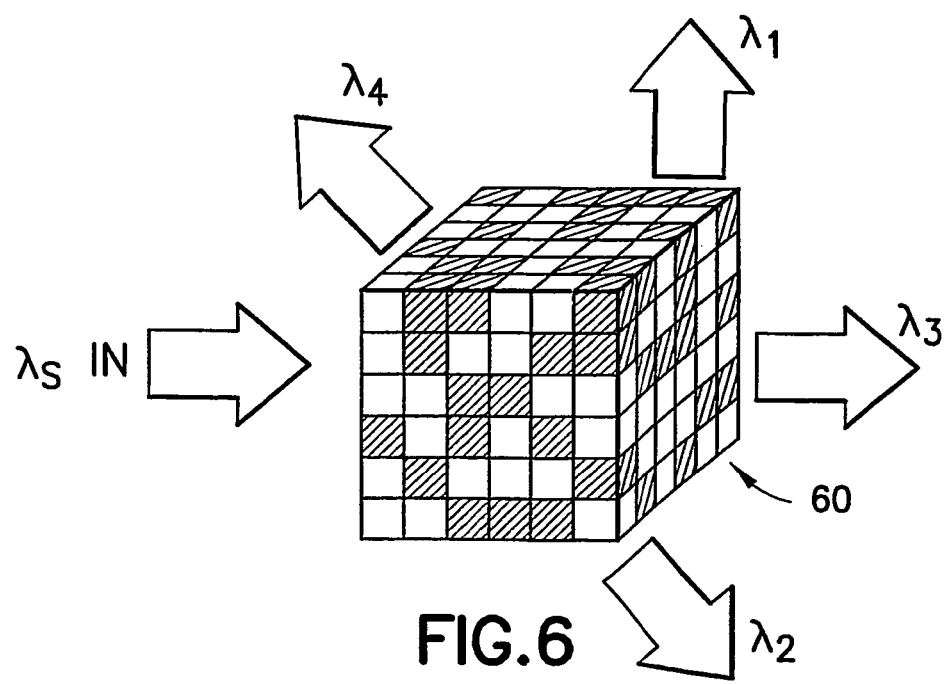
FIG. 6 is a schematic of a prototypical three dimensional (3D) supergrating.

Referring to FIG. 6 there is shown a schematic of a prototypical 3D supergrating 60 in an optical device including a 3-dimensional array of index, effective-index-, gain- and/or loss-modulated pixels; nominally employing a finite set of two or more levels of the modulated parameter or parameters. The pixels can be arranged in any ordered or periodic structure and can employ an arbitrary but repeating shape. The manufactured form of this device can exhibit non-binary or even a continuum of modulation levels either by design or due to the technical difficulties associated with producing a perfect specimen, but the pixels are nonetheless inscribed using a finite set of inscription methods or parameters that correspond to the ideal set of levels that makes the device a 3D BSG. Such a device can allow angularly and chromatically specific optical processing, in addition to emulating traditional optical components such as mirrors and lenses.

Synthesis of 3D Supergratings

Methods for synthesizing 3D supergratings include approaches very similar to those described above for 2D supergratings, except that the equations describe 3-dimensional spaces and the quantization method uses a 3-dimensional impulse response function to distribute the quantization error.

A 2- or 3-dimensional supergrating can be designed to create a structure featuring a complete or incomplete photonic band-gap (PBG). This can be done by designing a grating with any of the BSG design methods that possesses spectral features within or near the desired band-gap with sufficient strength and density to create the gap. Synthesis can involve the entire applicable area, or apply on a smaller scale to create a pattern that can be tiled to cover a larger area. The design may also use higher-order synthesis methods to allow for reduced resolution requirements.

A complete photonic band-gap material is one that exhibits a range of frequencies that cannot propagate through the medium, regardless of the propagation direction. The applications of such a medium are numerous and abound in the literature. Some examples are: optical filters and resonators, inhibitors or enhancers of optical radiation, materials for (super-) prisms, environments for novel laser and detector structure's, and substrates for optical guiding and wiring.

The BSG-based photonic band-gap offers key advantages over prior-art PBG materials, including: lower index-contrast requirements, and relaxed resolution requirements (both leading to higher compatibility with optical devices and eased manufacturing).

Synthesis of Supergratings by Optimization

A general method of designing supergratings of the one-, two-, or three-dimensional variety is presented here in addition to the methods described above:

Generate an analog profile with a procedure such as that of the first synthesis method (let the function be called P).

Generate a filter H that determines the wavelength range(s) of importance (in which spectral features are conserved) and their weights. H essentially assigns a weight for each frequency, where a high weight leads to better preservation of spectral information than a low weight. The filter H can be written in the form of a matrix operator to allow for a matrix solution of the following step, but may also employ impulse-response or pole-zero forms.

Solve the optimization problem:

$$\min_{X,V} C = \min_{X,V}\left[\sum |H(P-X)|^L + \sum_i V_i(X_i - n_{low})(X_i - n_{high})\right]$$

where X is a vector containing the values of the BSG, V is a vector of Lagrange multipliers, and L determines the type of norm for the optimization (L=2 corresponds to least-squares optimization, for example). The Lagrange multipliers force the BSG values to one of the allowed index values ($n_{low}$ or $n_{high}$), leading to a binary form. The function can be modified to allow for multi-valued supergratings in accordance with the teachings of the present invention.

The optimization can be carried out using any optimization method, although Newton-type methods are particularly useful and are presently preferred because of the matrix nature of the equation.

The approach can be applied to the synthesis of 2D and 3D gratings by taking the analog profile generated by the corresponding synthesis method and performing a similar optimization procedure, with the matrix equation modified to properly account for the dimensionality. This can be done by stacking the rows of the 2-dimensional grating into one row of the X variable, likewise with the P variable, and synthesizing a corresponding H matrix.

An H matrix can be generated as a Toeplitz matrix of a given impulse response function, or with other methods including:

Let $h_f$ be a vector representing the importance weight of the spatial frequency f. Then H is given by:

$$H = F^{-1}\mathrm{diag}(h_f)F,$$

where the n-dimensional F is the Fourier matrix given by:

$$F_{jk} = \frac{1}{\sqrt{n}}e^{2\pi i jk/n}(i=\sqrt{-1}).$$

Multiplication by the matrix F is equivalent to taking a Fourier transform of a vector, an operation which can be sped up by using the Fast Fourier Transform (FFT) method. This fact can be used with H filters of this sort to speed up the calculation of the cost function and its derivative to order n log(n).

Another alternative is to perform the optimization in the Fourier domain by considering both the P and X variables as their Fourier representations (generated by multiplying by F), while suitably converting the equality constraints:

$$\min_{X,Y}\tilde{C} = \min_{X,Y}\left[\left|h_f^T(\tilde{P}-\tilde{X})\right|^2 + \tilde{X}^T F\mathrm{diag}(V)F^{-1}\tilde{X} - V\right]$$

$$\tilde{P} = FP, \tilde{X} = FX$$

This representation can have the advantage of allowing for sparse representations for the $\tilde{P}$ and/or $h_f$ vectors, which can help reduce the computation time.

Tuning Mechanisms for Supergratings

The spectral characteristics of a supergrating can be shifted by any mechanism that produces a change in effective modal index. This can be accomplished if an electro-optic, electro-strictive, magneto-optic, electrochromic, and/or photosensitive medium is present as part of the device thereby allowing one or more of the design parameters to be modified using electronic control. Alternatively, modification of one or more of the design parameters can be effected using a change of the temperature, application of mechanical stress, and/or illumination of either the whole device or a section thereof.

Tuning mechanisms can include, but are not restricted to, the following: thermal, electro-optic, magneto-optic, opto-restrictive, mechanical strain (external, piezo, electrostatic, magnetostatic, accoustic), current injection, optical illumination, liquid crystal, reconfigurable molecules, chemical interaction, and mechanical translation.

For some devices, the benefit corresponds to a shift or change in strength of spectral characteristics; for others, functionalities beyond this emerge. In any case, it is implicit throughout this patent application, and in all device descriptions that follow, that the functionality of devices employing static supergratings can be further enhanced by replacing these with tunable supergratings.

Programmable Supergratings

Referring to FIGS. 7a-7d, there are shown exemplary embodiments of programmable supergratings. A programmable supergrating is a device that includes, in part, an array of electrically addressable electrodes together with a suitable medium, whereby the electrodes are used to establish a grating pattern in the medium. The grating pattern can be programmable, dynamic, or fixed. The grating pattern can nominally utilize a finite number of modulated levels (e.g. two levels for a BSG, more for a supergrating), or utilize a continuum of modulated levels.

Another embodiment (FIG. 7a) includes an array of MEMS (micro-electro-mechanical system) 7a2 fingers placed above one or more waveguides 7a3; where each finger corresponds to a "bit" of the BSG, and can be individually deflected downwards to touch the waveguide 7a2 surface. Alternately, the "off" state can correspond to contact between finger and waveguide, with "on" deflection upwards and away from the waveguide. In any case, the state with waveguide contact will generally yield a higher effective index, and that with no contact will yield a lower index. The preferred embodiment has an off-waveguide separation sufficiently large that slight errors in this value negligibly change the lower effective index value, thereby facilitating true binary operation.

Figure 7A:
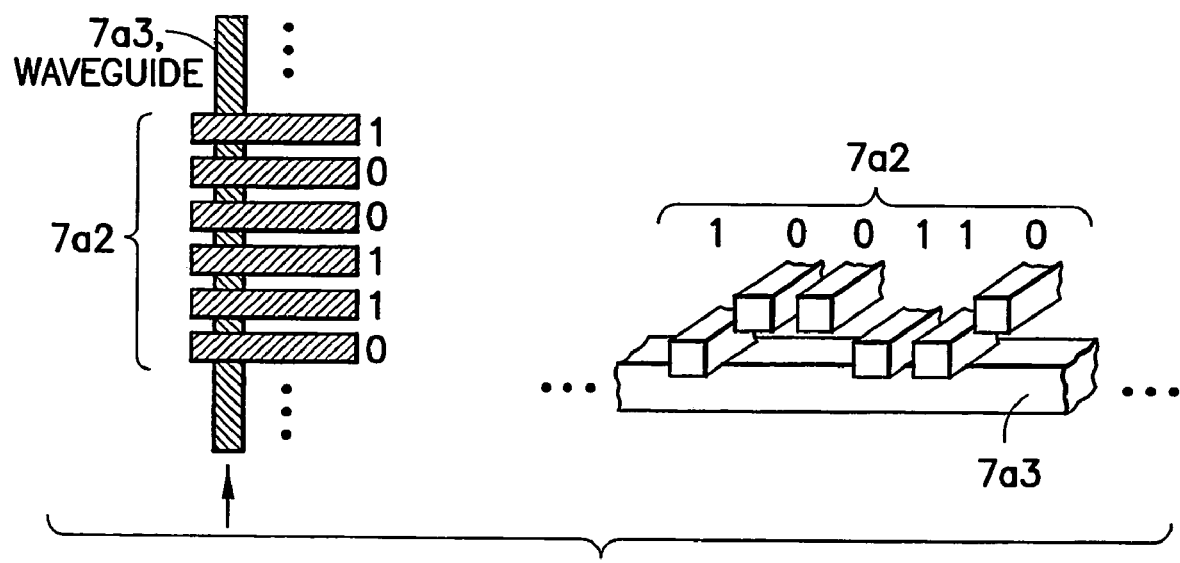
FIGS. 7a-7d show embodiments of programmable supergratings.
Figure 7B:
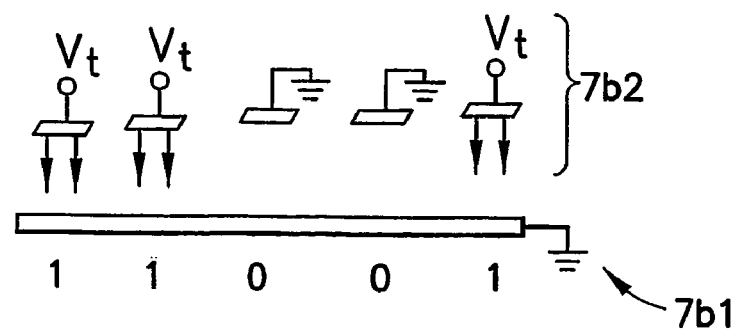

Yet another embodiment, shown in FIG. 7b includes a plurality of electrodes disposed over encapsulated liquid crystals 7b2 (LCs) that affect propagation. In the nematic phase, LCs exhibit a birefringence that can be tuned with voltage, thereby yielding a means of tuning effective index. This voltage-dependence typically has some threshold voltage Vt (corresponding to full alignment of nematic LCs) above which little or no further index change occurs. A method employing control voltages of V=0 and V>$V_t$ should therefore facilitate true binary operation, even in the face of confounding effects such as field fringing.

Co- and Counter-directional Asymmetric-waveguide BSG Couplers

We begin by describing two fundamental elements of many of the more complex devices that follow: namely, co-directional and counter-directional asymmetric-waveguide BSG couplers. These elements (which can indeed be devices in themselves) couple light from one waveguide to another parallel waveguide, with a desired spectral response: i.e. light at a given wavelength can be coupled fully, fractionally, or not at all, and with a desired phase.

Figure 7C:
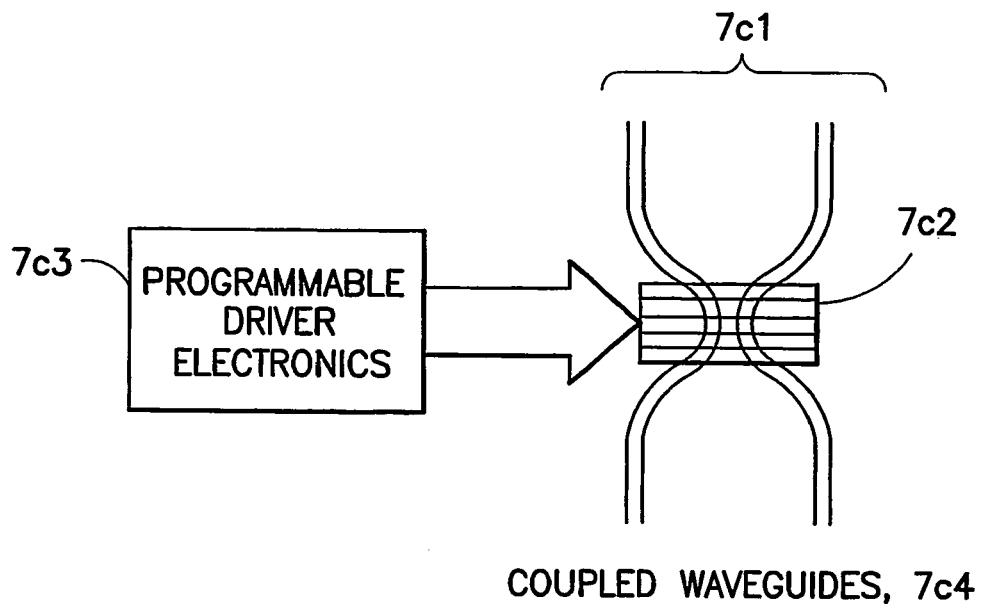
Figure 7D:
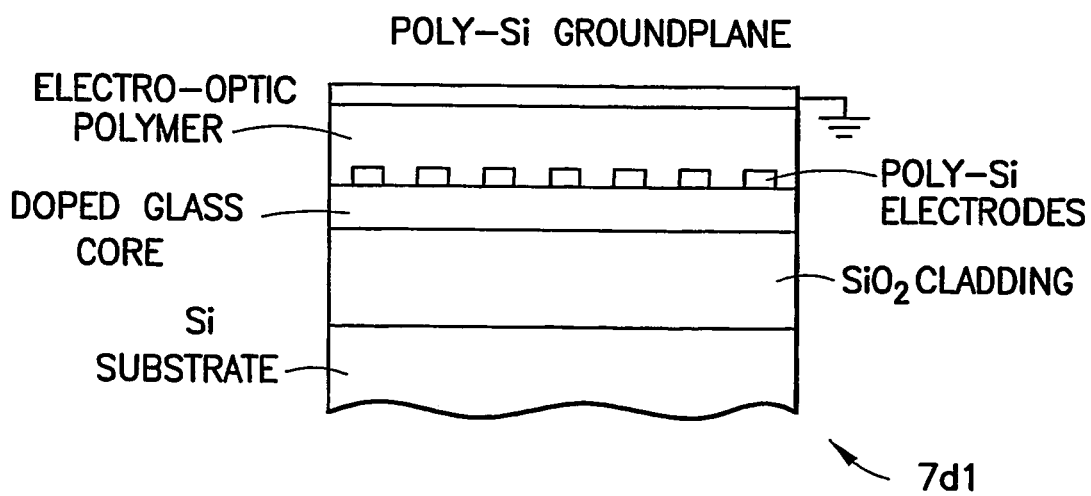

The general embodiment, FIG. 7c, includes two parallel asymmetric waveguides, which will have differing effective modal indices $(n_{eff})_1$ and $(n_{eff})_2$, and hence different propagation vectors $k_1(\lambda_0)=2\pi(n_{eff})_1/\lambda_0$ and $k_2(\lambda_0)=2\pi(n_{eff})_2/\lambda_0$, where $\lambda_0$ is free-space wavelength.

The effective indices will in general be dependent on wavelength $\lambda_0$. Signals from electronics drivers 7c3 are applied to electrodes denoted by 7c2 that change the modal distribution to induce coupling.

Light will couple co-directionally from one waveguide to another neighboring waveguide if their respective modal profiles overlap; this is known as intrinsic coupling, and will generally occur for all input wavelengths. Intrinsic coupling is a parasitic effect in the context of BSG-enhanced coupling, and the optimal design seeks to ensure that the latter dwarfs the former. This condition becomes easier to satisfy as waveguide asymmetry (i.e. the difference between $(n_{eff})_1$ and $(n_{eff})_2$) increases.

Co-directional Asymmetric-waveguide BSG Coupler

Figure 8:
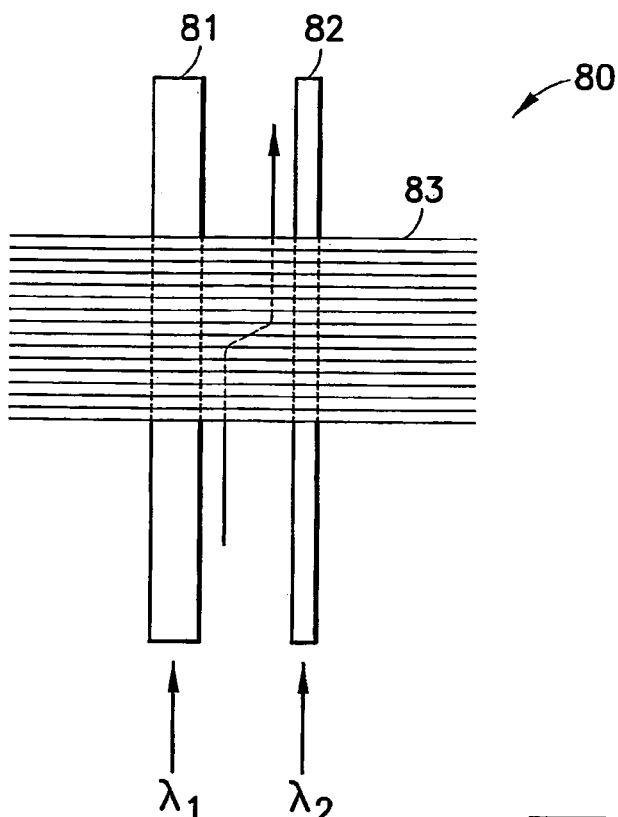
FIG. 8 is a schematic of a co-directional asymmetric-waveguide BSG coupler.

Referring to FIG. 8, there is shown a schematic of co-directional asymmetric-waveguide BSG coupler 80. Co-directional coupling from one waveguide 81 to another neighboring waveguide 82 (i.e. with overlapping modal profiles) will be enhanced at a particular wavelength $\lambda_0$ if the waveguides' effective indices are perturbed with spatial frequency $K_g(\lambda_0)=k_1(\lambda_0)-k_2(\lambda_0)$. This can be accomplished using any BSG embodiment, including possibilities such as, but not limited to, placing a BSG 83 between the two waveguides, as described above; or implementing BSGs laterally in one or both waveguide, also described above. Arbitrary spectral coupling characteristics are achieved by having the BSG 83 emulate the appropriate spectrum of $K_g(\lambda_0)$.

Counter-directional Asymmetric-waveguide BSG Coupler

Figure 9:
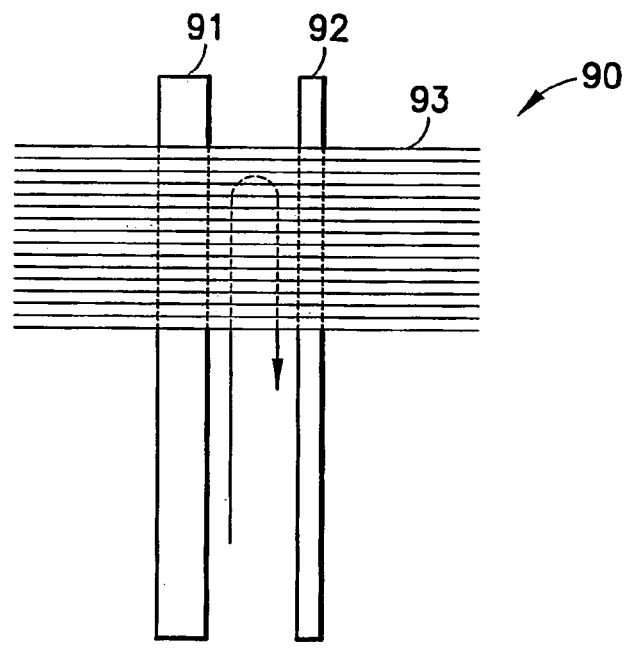
FIG. 9 is a schematic of a counter-directional asymmetric-waveguide BSG coupler.

Referring to FIG. 9 there is shown a schematic of counter-directional asymmetric-waveguide BSG coupler 90 coupling waveguides 91 and 92. For the above embodiment, counter-directional coupling will occur for a given input wavelength $\lambda_0$ if the index perturbation instead includes a spatial frequency of $K_g(\lambda_0)=k_1(\lambda_0)+k_2(\lambda_0)$. The BSG 93 should be kept free of spatial frequencies of $2k_1(\lambda_0)$ and $2k_2(\lambda_0)$ over the entire spectral band of interest, as these will produce back-reflection within the respective waveguides, thereby decreasing coupling efficiency and yielding undesired back-reflection. Satisfying this condition requires that waveguide asymmetry be sufficient to avoid any overlaps between grating spatial frequencies ($K_g$'s) yielding inter-waveguide coupling and those yielding intra-waveguide coupling, over all wavelength range(s) of interest; mathematically, this can be expressed as:

$$k_1(\lambda_1)+k_2(\lambda_1) \neq 2k_1(\lambda_2) \text{ and } k_1(\lambda_1)+k_2(\lambda_1) \neq 2k_2(\lambda_2)$$

where $k_1$ and $k_2$ are defined earlier with wavelength-dependent effective index, and $\lambda_1$ and $\lambda_2$ are any combination of wavelengths lying within the range(s) of interest.

It will be appreciated that if either of the waveguides is multimode, other overlaps should also be avoided, namely between the range of grating frequencies pertaining to desired and undesired coupling (whether co- or counter-directional).

Counter-Directional Symmetric-Waveguide BSG Coupler

Figure 10:
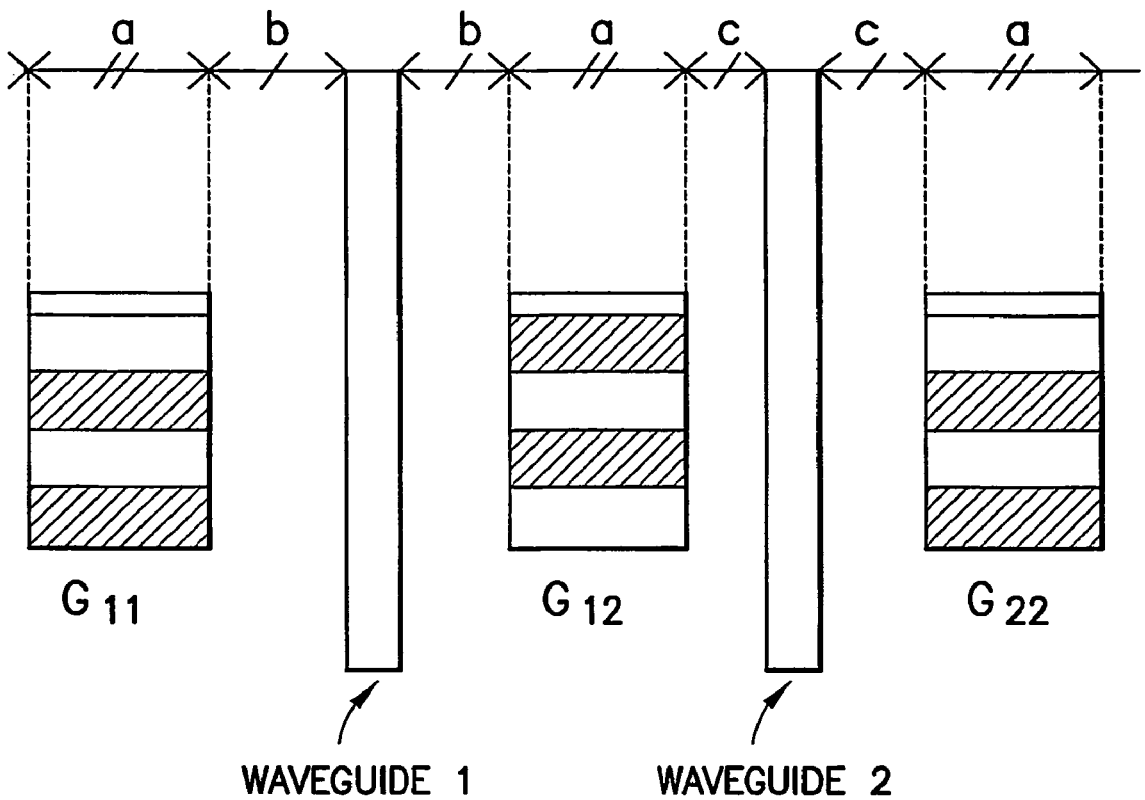
FIG. 10 is a schematic of a counter-directional symmetric-waveguide BSG coupler.

Referring to FIG. 10 there is shown a schematic of counter-directional symmetric-waveguide BSG coupler. The symmetric BSG counter-directional coupler performs the same functions as the asymmetric counter-directional coupler (programmable, dynamic or static) but allows the two waveguides to be weakly asymmetric or even symmetric in their effective index. Thus, the limits expressed in the previous expression can be exceeded, albeit that this would normally lead to intra-waveguide reflection. The method outlined below allows for efficient coupling between neighboring symmetric waveguides, while suppressing intra-waveguide reflection.

The device includes two waveguides (symmetric or otherwise) with a BSG 612 placed between them. The BSG can be static, tunable, or programmable as necessary. Two more BSGs 611 and 622, identical to the middle BSG but with opposite contrast (1's become 0's and vice-versa), are placed on either side of the two waveguides such that they mirror the center BSG about the corresponding waveguide.

The principle of operation is as follows: let $m_1$ be the modal profile of guide 1 and $m_2$ be the modal profile of guide 2. With loose notation, the coupling coefficients relating the two waveguides can be written to first order in grating strength as:

$$C_{12} \propto \int m_1^* m_2 G_{12} + \int m_1^* m_2 (G_{11}+G_{22}) \cong \int m_1^* m_2 G_{12},$$

where $G_{12}$ is the center grating and $G_{11}$ & $G_{22}$ are the gratings on the far side of waveguides 1 and 2 respectively. The second term is negligible because the two side gratings are very far from the opposite waveguide (more precisely, the opposite waveguide's modal profile is negligible in this region).

However, the coupling coefficient from the first waveguide to itself (corresponding to intra-waveguide reflection) follows:

$$C_{11} \propto \int |m_1|^2 G_{11} + \int |m_1|^2 G_{12} = 0 \text{ (because } G_{11}=-G_{22} \text{ and symmetry)}$$

The result is identical for the second waveguide. The only assumption necessary for the cancellation is that the modal profiles of both waveguides be substantively symmetric (about their waveguide, not necessarily identical to each other; it will be appreciated that waveguide coupling will generally introduce at least some element of asymmetry) and that the gratings be properly symmetrized about the guide. The cancellation is independent of many material parameters such as the waveguides' effective indices, even if they vary independently.

BSG Couplers Using Lateral Waveguide Variations

This particular embodiment of implementing a BSG is given special mention here due to its particular advantages, as well as some anticipated further subtleties which will be discussed later, such as: optimal width variation for asymmetric-waveguide coupling, with particular regard to the relative BSG strength in each waveguide; and how to design the reverse-contrast grating of the symmetric-waveguide coupler so as to minimize intra-waveguide reflection.

The advantages of this embodiment are similar to those described above, distinguished by the fact that there are now two (or more) waveguides, where the waveguide alignment is critical. It will be appreciated, that the waveguides and BSGs can be advantageously patterned and etched together, thereby simplifying fabrication; further, the waveguides and grating are automatically self-aligned, easing tolerances.

BSG Crossbar Switch

Figure 11:
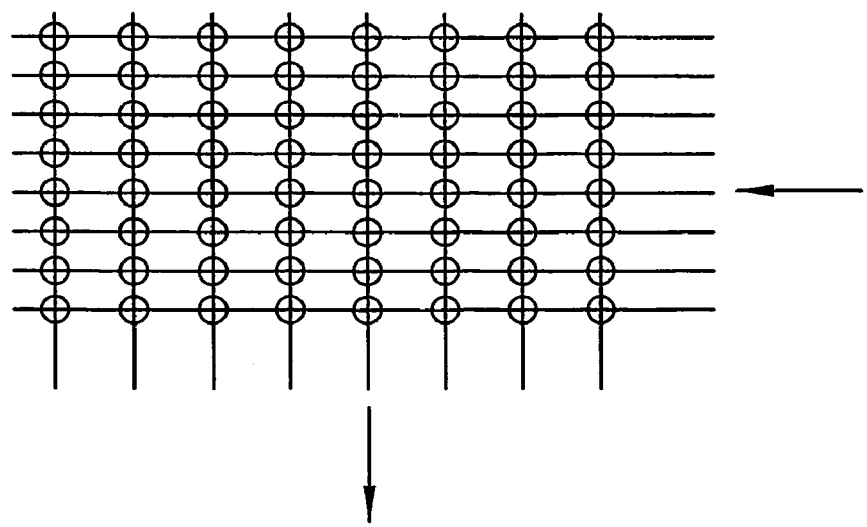
FIG. 11 is a schematic of the grid-topology cross bar switch.

Referring to FIG. 11, there is shown a schematic of a grid-topology cross bar switch. The crossbar switch is a device that routes wavelength channels from a number of input waveguides to a number of output channels (usually matching the number of input waveguides). The crossbar switch generally needs to be able to route any wavelength from any input waveguide to any output waveguide. These switches are typically denoted by a N×N notation, where N represents the product of the number of input/output waveguides and the number of wavelength channels; for example, a switch with 4 input waveguides, 4 output waveguides, and 16 wavelength channels per waveguide is called a 64×64 switch.

Traditional crossbar switches use a grid topology where each of the n input waveguides is first de-multiplexed into its c wavelength channels, resulting in n×c input "rows" that are crossed over with n×c output "columns". These columns are then multiplexed into groups fed into the n output waveguides. Routing occurs by means of an optical switch placed at each intersection of row- and column. This design is especially common with micro-electro-mechanical systems (MEMS), where the switches are implemented using movable mirrors. Clearly, this topology requires $(n \times c)^2$ switching elements. Another topology can use 2×2 switches, that is, switching elements with two inputs ($I_1$ and $I_2$) and two outputs ($O_1$ and $O_2$); that either connects $I_1$ to $O_1$ and $I_2$ to $O_2$, or $I_1$ to $O_2$ and $I_2$ to $O_1$. The problem lies in choosing the arrangement and number of switches so that the input optical signals can be rearranged to all possible permutations at the output. To determine the number of switches required we can note that there are $(n \times c)!$ possible permutations of the inputs; since every 2×2 switch provides one bit of control we can say that:

$$O(\log_2(nc)!) = O((nc)\log_2(nc))$$

Figure 12:
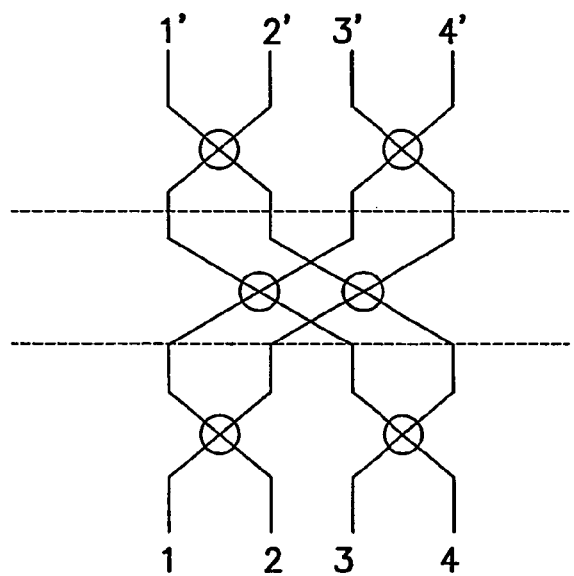
FIG. 12 is a schematic of an embodiment of a 4-fiber switch, utilizing 6 switching elements.

It will be appreciated that a programmable BSG (e.g., a tunable co-directional or counter-directional coupler as described above) can be used to form the 2×2 switch. Thus, each BSG switching element can provide the 2×2 functionality independently for each input wavelength. Advantageously, this eliminates the need to first demultiplex the input waveguides, and reduces the number of required switches:

$$\text{no. of switching elements} = O(n \log_2 n)$$

where n is the number of input waveguides only, leaving no dependence on the number of wavelength channels c. (See FIG. 12, showing a schematic of one embodiment for a 4-fiber switch, utilizing 6 switching elements 120.

Another embodiment can use layered 2×2 BSG switching elements, where each layer has the same number of switching elements equaling n/2, where n represents the number of input waveguides, each carrying c wavelength channels. In this embodiment, the switches can be connected with each other in the following way:

Let waveguide w connect to waveguide $w+2^{l-1}$, where l is the layer number (starting from 1).

When $2^l = n$ use the above formula by setting l=1 again (wrap back).

This is only one particular wiring method and many more can be conceived, especially by drawing from prior art in binary switching tree design.

The number of switching elements employed by a design of this sort is given by:

$$\text{no. of switching elements} = \frac{n}{2} \text{ceil}\left[\frac{\text{ceil}[\log_2(n!)]}{n/2}\right],$$

where the cell function generates the smallest integer number that is greater than its argument.

It will be appreciated that the savings generated by this design method can be enormous and are illustrated in table 1.

TABLE 1

| | | switching elements | | |
|---|---|---|---|---|
| Input waveguides (n) | wavelength channels per input (c) | grid design | single-wavelength layered design | multi-wavelength layered design |
| 4 | 16 | 256 | 96 | 6 |
| 6 | 32 | 1152 | 384 | 12 |
| 8 | 64 | 4096 | 1024 | 16 |

While the number of switching elements in the supergrating case are given by the formula above, the number of switches in the grid design case are specified by $c \cdot n^2$, while the number of single-wavelength switches in the layered design is given by c times the number of switching elements in the BSG design.

In addition, embodiments using Programmable BSGs avoid the need for multiplexers and demultiplexers, further enhancing the savings. The single-wavelength design can also be implemented with co-directional and counter-directional couplers employing Bragg gratings instead of BSGs.

Direct Writing of BSGs in Optical Fiber

The following sections describe methods of implementing BSGs in an optical fiber whose index and/or effective modal index can be altered via exposure to intense and/or high-energy laser light.

One-photon Process

Figure 13:
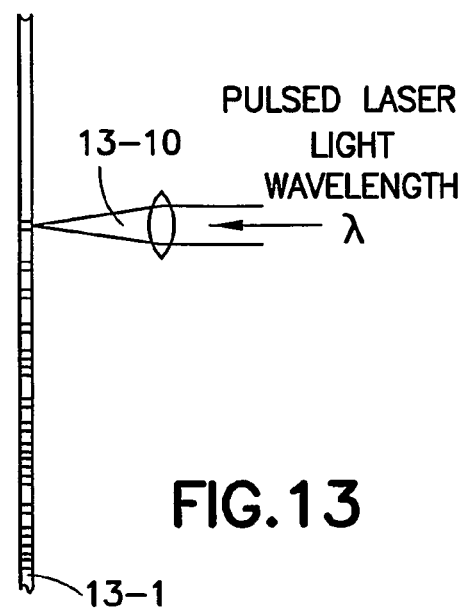
FIG. 13 illustrates a one-photon method of implementing a BSG in optical fiber.

Referring to FIG. 13 there is shown a One-photon method of implementing a BSG in optical fiber. In this embodiment, a grating employing binary or multi-level features (index or effective index change, ablation, loss modulation, etc.) is impressed upon a photo sensitive optical fiber 13-1 by means of a switchable, focused laser beam 13-10, that directly imprints the grating information on the fiber as it is moved with respect to the laser's focus as indicated by the arrow, at either constant or variable speed. In an alternate embodiment, the fiber is stationary and the laser's focus is manipulated to scan the fiber.

Multi-photon Process

Figure 14:
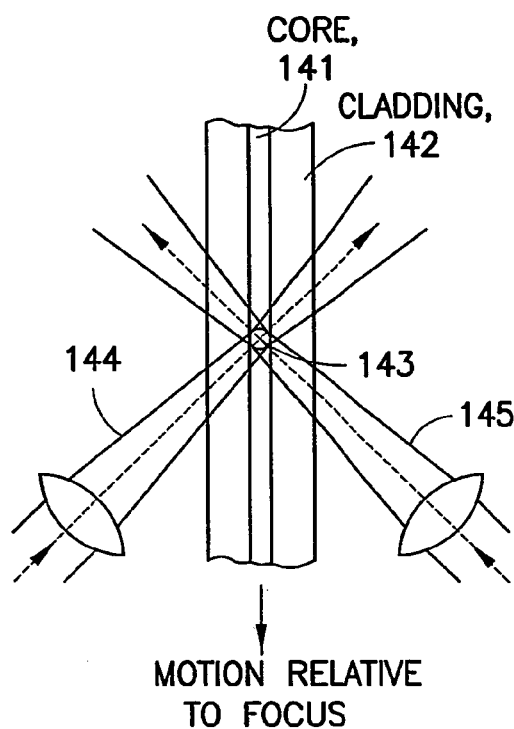
FIG. 14 illustrates a multi-photon method (two-photon shown) of implementing a BSG in optical fiber.

Referring to FIG. 14 there is shown a Multi-photon device (two-photon shown here) 140 implementing a BSG in optical fiber. A method similar to the above, with the exception that two or more laser beams 144, 145 are employed for the process, and the information (i.e. shift in index) is preferentially imprinted where a subset of these beams intersect 143 and/or constructively interfere. It will be appreciated that this embodiment offers advantages whether the underlying photosensitivity mechanism be intensity-dependent or energy-dependent. In the former case, the constructive interference of N (equal amplitude) beams yields $N^2$ times the intensity of a single beam; in the latter, the setup can be arranged so that aggregate photonic energy sufficient to effect the transition in questions exists only where the beams intersect.

This embodiment allows for increased control over the region within the fiber upon which the information is impressed (for example, index can be altered only at the core 141 if the beams are made to intersect here), and can also simplify manufacturing in that the outer cladding need not necessarily be stripped, as can be required for the single-photon process.

The following describes alternate embodiments of the present invention that employ some combination of super-gratings and the modular elements of the previous section. It will be appreciated that any BSG mentioned here can be replaced by the more general multi-level supergrating embodiment, which can in turn be replaced by tunable and/or programmable embodiments in accordance with the teachings of the present invention.

Wavelength Demultiplexer

A demultiplexer separates a multi-wavelength (i.e. multi-channel) input into its constituent channels. This demultiplexer functionality can be achieved using BSGs in a variety of embodiments, described in more detail below.

Multi-level supergratings in accordance with the teachings of the present invention are also suitable for demultiplexers and filters with uneven channel spacing (or any other channel-spacing scheme). It will be recognized that an advantage of such a demultiplexer embodiment of the present invention advantageously reduces problems such as SRS (stimulated Raman scattering), which are compounded when channels are equally spaced in terms of photonic frequency (energy).

Demultiplexer Employing 1D Supergratings

Referring to FIG. 15 there is shown a schematic of a demultiplexer employing 1D BSG. This device includes, in part, a set of waveguides coupled using counter-directional and/or co-directional BSG couplers 15-1-15-3, as described above, with the effect that multi-wavelength light entering the device through a specified input port is divided into its wavelength components, and which leave the device through their assigned output ports.

Particular embodiments include: a cascade of co-directional and counter-directional BSGs, which successively divide the channels in two sub-bands until individual channels are extracted; and a sequence of tilted single-channel gratings which direct individual channels to their respective output waveguide.

Demultiplexer Employing 2D Supergratings

This embodiment, shown in FIG. 16, includes a 2D BSG with the effect that multi-wavelength light entering the device through a specified input port is divided into its wavelength components, which leave the device through their assigned output waveguides.

Add/drop Filters

In this embodiment, an optical add/drop filter, as shown in FIG. 17, is an optical device 170 including an "in" port 171, which accepts an input of multiple wavelength-channels; a "drop" port 172, through which one or more channels separated from the "in" stream are routed; and a "through" port 174, from which the remaining channels emerge. An additional "add" port may also be present, which accepts inputs at wavelength-channels being dropped from the "in" stream, and routes them to the "through" output.

Static Add/drop Filter

Figure 18:
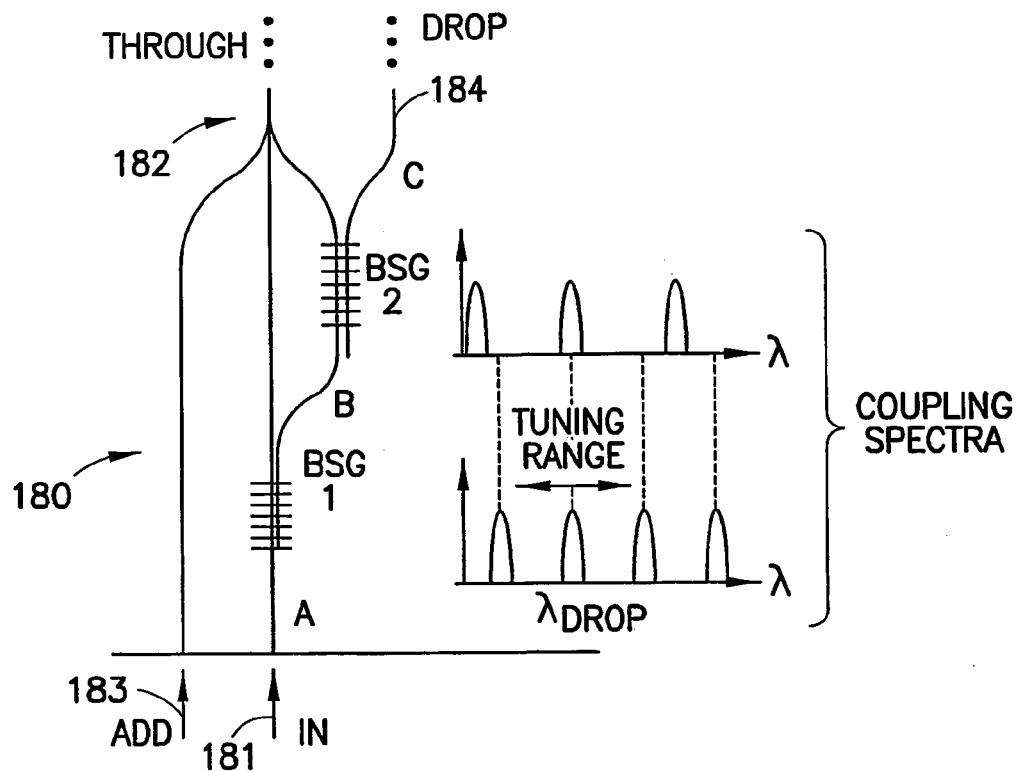
FIG. 18 is a schematic of a Vernier-tuning dynamic add/drop filter.

Referring to FIG. 18, there is shown an optical device embodiment of the present invention, including one or more 2D BSGs and/or a set of waveguides coupled using counter-directional, and/or co-directional BSG couplers. In this embodiment, one or more wavelength components of light entering the device through a specified input ("in") port 181 is separated and leaves the device through a specified output ("drop") port 184. The remainder of the input light leaves the device through a different output ("through") port 182. In addition, the device can include an additional input ("add") 183 port with the property that particular, or all wavelength components, entering the device through that port, also leave through the "through" port 182 thereby being added to the light routed there from the "in" port.

Still referring to FIG. 18. BSG 1 couples a subset of input $\lambda$'s from waveguide A to waveguide B. BSG-2 couples a subset of the first subset from B to C. This process continues until only the desired wavelength(s) remain in DROP waveguide. It will be appreciated that BSG-1 and BSG-2 can be tuned to select desired $\lambda$ over a range which exceeds an intrinsic tuning range $\Delta\lambda/\lambda \approx \Delta n/n$. It will be further appreciated that in alternate embodiments that a counter directional coupling may be employed. In this embodiment the Add port 183 can be made $\lambda$ selective through a similar Vernier approach.

Dynamic Add/drop Filter

Figure 19:
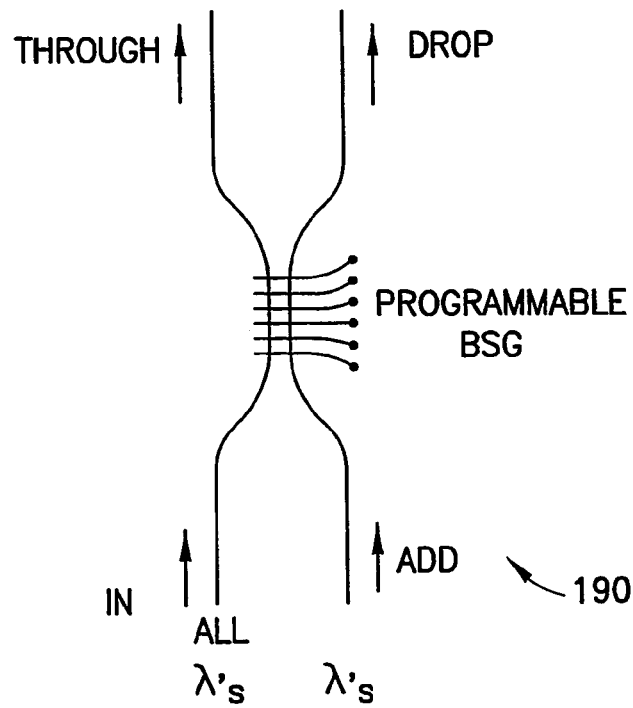
FIG. 19 is a schematic of a programmable BSG add/drop filter.

Referring to FIG. 19, there is shown an optical device embodiment 190 including one or more 2D BSG and/or a set of waveguides, where the waveguides are coupled-using tunable or fixed counter-directional and/or co-directional BSG couplers with the same effective functionality as the static BSG add/drop filter, but with the addition that the wavelength(s) directed from the "in" port to the "drop" port and/or the wavelength(s) directed from the "add" port to the "through" port are controllable by means of external control signals.

One particular embodiment makes use of the Vernier tuning principle, with a design motivated by the fact that the spectral shifts accessible through index tuning are often much less than the total desired tuning range. Multi-channel input enters along one waveguide, with light coupled to an adjacent waveguide by a multi-peak tunable BSG (with peak spacing generally less than the available tuning range). A subsequent tunable BSG (generally multi-peak with a different spacing which also less than the available tuning range) couples a subset of this first set of channels to a third waveguide. This decimation process can continue as desired, with the BSGs independently tuned relative to one another to drop desired channel(s). The channel selection range can thus greatly exceed the available index-tuned spectral shift. The same set of BSGs can be used to add the dropped channels from a second input, as shown in FIG. 18.

Another embodiment uses a programmable BSG, enabling a structure such as that shown in FIG. 19 that can dynamically add and drop any subset of input channels.

Wavelength Stability Monitor

To function properly, optical networks require that channel wavelengths remain within some range of their nominal value. Drifting can be caused by a number of factors, including variations in environmental conditions, device aging, and mechanical disruptions.

Figure 20A:
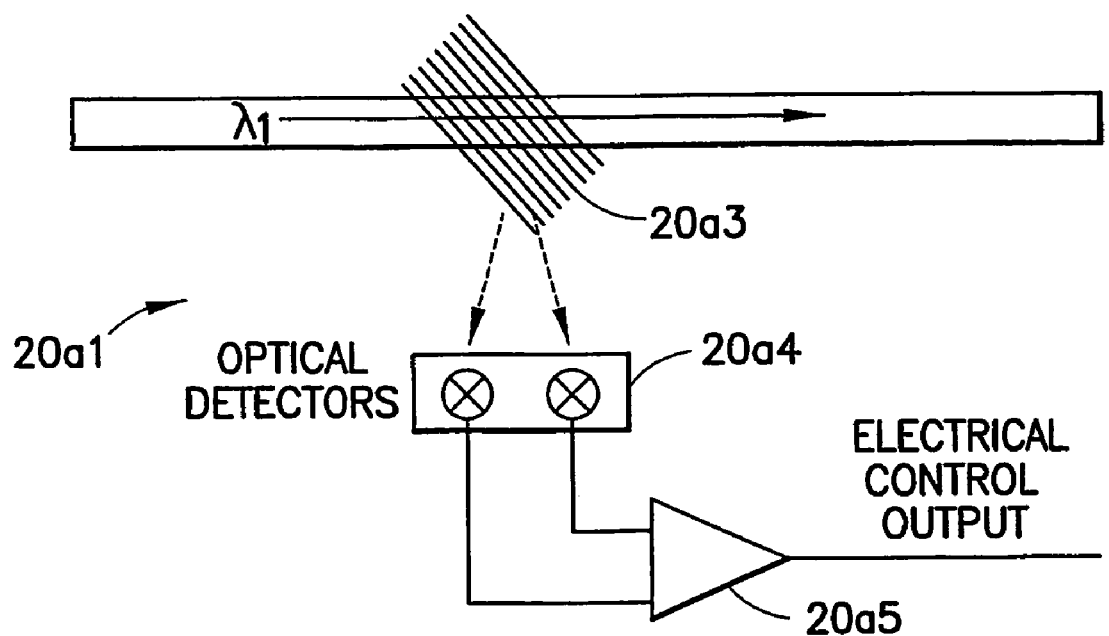
FIGS. 20a-20c are schematics of embodiments of BSG-based wavelength stability monitors.
Figure 20B:
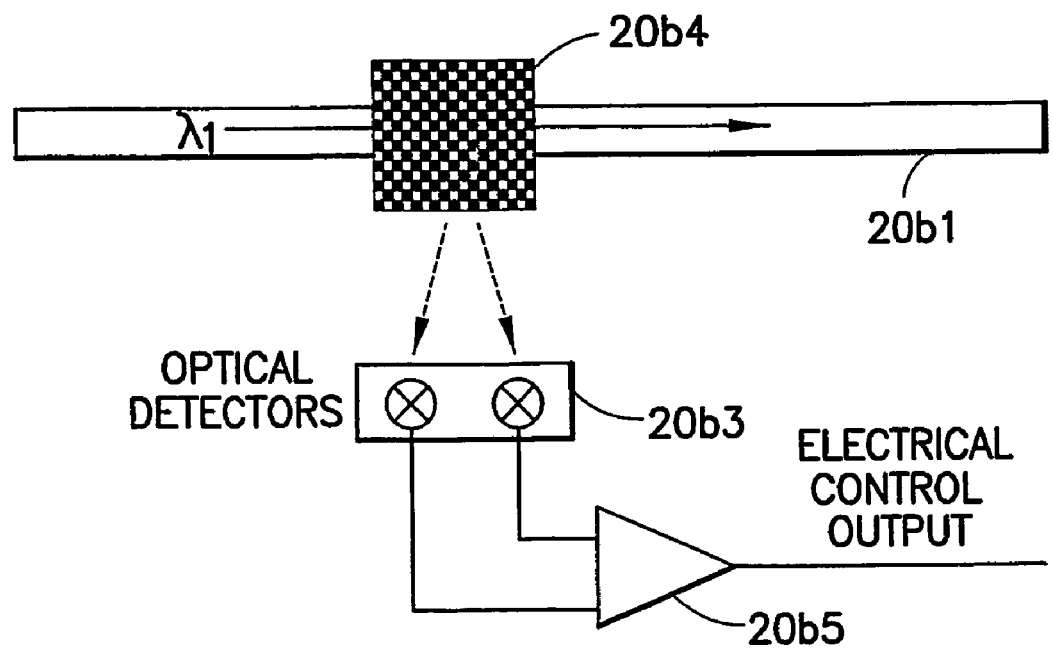
Figure 20C:
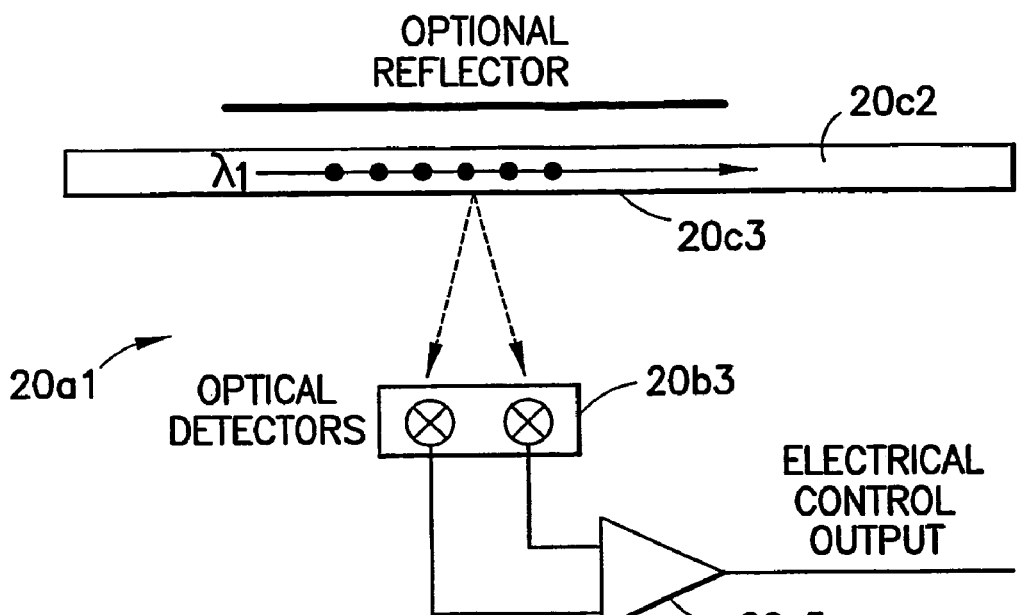

Wavelength drift can be monitored using a 1D supergrating in accordance with the teachings of the present invention, as shown in FIG. 20a. While light incident at a given input angle on a tilted 1D 20a3 grating will nominally diffract at only a particular output angle, detuning from a central peak-reflectance wavelength will in fact yield a detuning in angle, along with a decrease in diffraction efficiency.

This behavior may be used to detect shifts in wavelength, or, assuming the wavelength to be true, shifts in device characteristics which can then be compensated through a variety of mechanisms (e.g. temperature tuning). In one embodiment, a photodetector array $20a4$ symmetrically aligned along the diffraction path $20a2$ of the desired central wavelength may be used to detect wavelength shift; in this configuration, the signal from each will match if local wavelength matches the desired value. (Note that diffraction efficiency will normally be intentionally low, so that most power passes through un-deviated.) Deviations in local wavelength are then manifested by a change in the relative values of the photodetectors $20a4$, which can be monitored by passing their outputs through a logarithmic subtraction processor $20a5$ (other more sensitive functions may be employed). These deviations can then be corrected for using temperature or any other influencing parameter.

Similarly, an alternate embodiment can be implemented with a 2D BSG $20b4$ as shown in FIG. $20b$, which can focus diffracted light to the detectors $20b3$ and/or detect drifts in wavelength on several channels simultaneously; or with a sequence of quasi-1D (i.e. point-source) features $20c3$ etched along a waveguide $20c2$ as shown in FIG. $20c$ (detection and processing being done in units $20c3$ and $20c4$), which will lead to symmetric diffraction in both lateral directions. A mirror may optionally be etched at one side, for optimal collection of scattered light.

Tap-off Network Monitor

To dynamically re-configure channel assignments ("wavelength provisioning"), a network requires feedback on channel usage; such reconfigurability is particularly needed for metropolitan optical networks (MONs).

Figure 21:
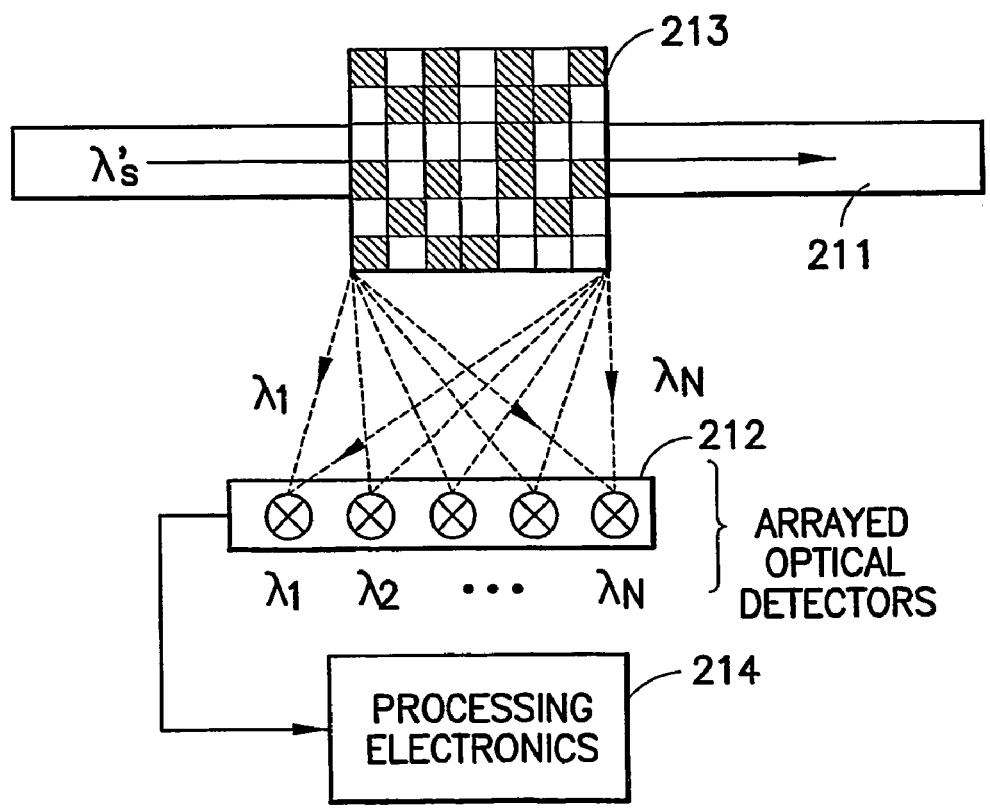
FIG. 21 is a schematic of a 2-D BSG network monitor.

Network monitoring can be accomplished using 1-D or 2-D supergratings in accordance with the teachings of the present invention (FIG. 21 shows a 2D network monitor embodiment) to tap off a portion (typically small by design) of input light and separate it into individual channels. The separated channels are then focused on a detector array 212, where their power is measured and the information converted into a single electrical signal. This signal can be processed by processor 214 and transmitted to a monitoring station (not shown) in a metro network along an electrical network, and provide diagnostic data facilitating wavelength provisioning; or aid in identifying problems in the network (e.g. showing where a channel is losing power); compiling load statistics; and measuring fault tolerance.

Multi-wavelength Equalizer and Gain-flattening Filters

For optimal functioning, optical networks generally require that wavelength channels be balanced in power. Balancing typically occurs either within, or following the amplification stage, and is correspondingly named "gain-flattening" or "equalizing" respectively. A power-balancing device can additionally serve to suppress undesired signals such as the pump wavelength in optical amplifiers.

Dynamic Multi-wavelength Equalizer

In this equalizer embodiment, dynamic equalization can be achieved by routing input wavelengths through a tap-off network monitor (FIG. 22A) that separates channels and monitors their respective power levels % (see FIG. 22B, showing a curve of power versus wavelength). The signals are then transmitted to an electronic processor, whose output tunes (or programs) a sequence of BSGs in accordance with teachings of the present invention, which equalize the power across channels, e.g. by removing power in various wavelength bands. FIG. 22C shows an example of power removed as a function of wavelength. Suitable methods for clipping wavelength power include using BSGs to couple input channels to an output waveguide with lower efficiency or using BSGs to impose higher scattering losses. FIG. 22D shows the result of subtracting appropriate amounts of power in a set of wavelength bands, thereby producing substantially equal power in each band.

One embodiment employs a cascade of BSGs that includes "basis functions" which can be independently tuned to effect the loss spectrum required for equalization; suitable basis functions include step-like spectra that can be shifted relative to one another.

Gain-flattened Optical Amplifiers

FIG. 23 illustrates an alternate channel-balancing embodiment. In this embodiment a BSG 23-1 (FIG. 23A) is incorporated directly within the amplifier that serves to shape the gain spectrum as desired. The gain spectrum (shown unperturbed in FIG. 23B) can be flattened, or tailored to any other profile, perhaps in anticipation of wavelength-dependent losses following amplification. FIG. 23C shows a loss coefficient spectrum matched to the gain spectrum of FIG. 23B. FIG. 23D shows the combined gain coefficient spectrum, combining the gain of the medium and the losses imposed on it. It will be appreciated that this embodiment offers much greater efficiency than typical post-amplifier equalization, which follows from recognizing that flattening the gain coefficient (the gain per unit length within the amplifier) wastes far less power than flattening post-amplification gain.

Gain flattening, in accordance with the teachings of the present invention, can be applied to any optical amplifier including Raman amplifiers, erbium-doped fiber amplifiers (EDFAs), and semiconductor optical amplifiers (SOAs); as well as to multi-wavelength sources such as tunable lasers.

It will be appreciated that, gain flattening not only improves efficiency, but also can dramatically extend amplifier bandwidth, particularly where the intrinsic gain spectrum is strongly peaked. This is especially true with semiconductor optical amplifiers (SOAs), whose bandwidth is so narrow as to provide gain for only a very few (often one) channels.

Lambda Router

Lambda routers—also known as called wavelength routers, or optical cross-connects are devices positioned at network junction points which route wavelength(s) from a specific fiber optic input to another specific fiber optic output. Lambda routers are generally N×N devices (i.e. with N input fibers and N output fibers), with each input fiber typically conveying a single wavelength channel.

In a Lambda routing embodiment of the present invention, Lambda routing can be accomplished by coupling demultiplexed input from a BSG-based device into an array of waveguides as shown in FIGS. $24a$ and $24b$ (i.e. one channel per waveguide). It will be appreciated that FIGS. $24a$-$24b$ represent lambda routers when there is one input/output fiber and cross-bar switches when there are multiple input and output fibers. A second array of waveguides exists beneath the first set, with each pair of top-waveguides and bottom-waveguides separated by a BSG with a flattop spectrum centered at the channel wavelength (i.e. co-directional or counter-directional coupling). Cross/bar operation (i.e. channel light on one waveguide will couple to the other, and vice versa; or will remain on the same waveguide) is achieved by locally tuning the BSGs in or out of alignment with the channel wavelength. It will be appreciated that add/drop functionality is a built-in aspect of this embodiment.

Figure 24A:
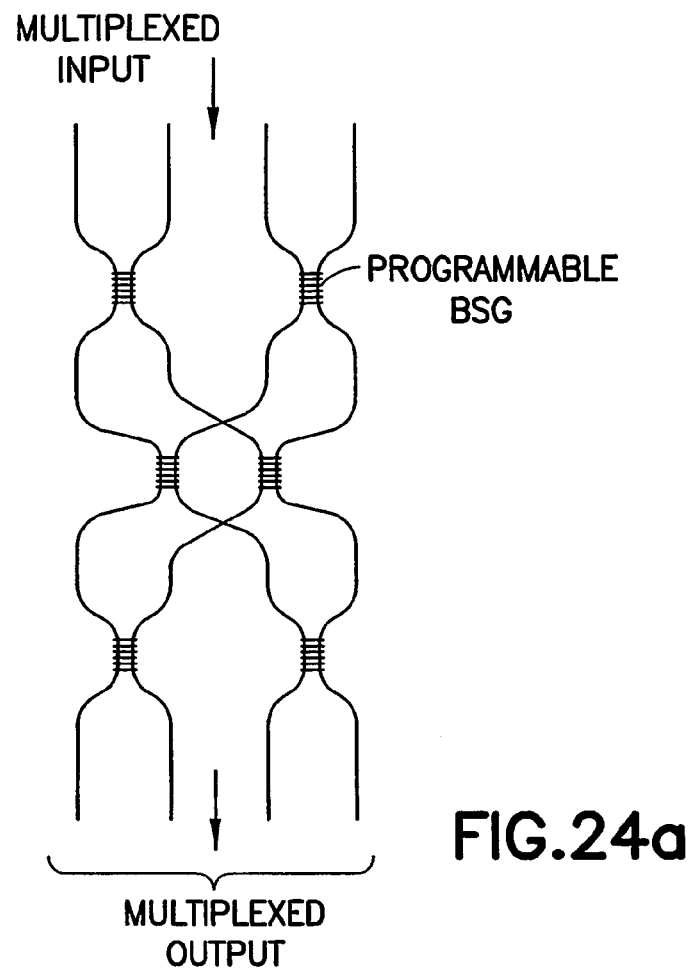
FIGS. 24a-24b are schematics of lambda router embodiments.
Figure 24B:
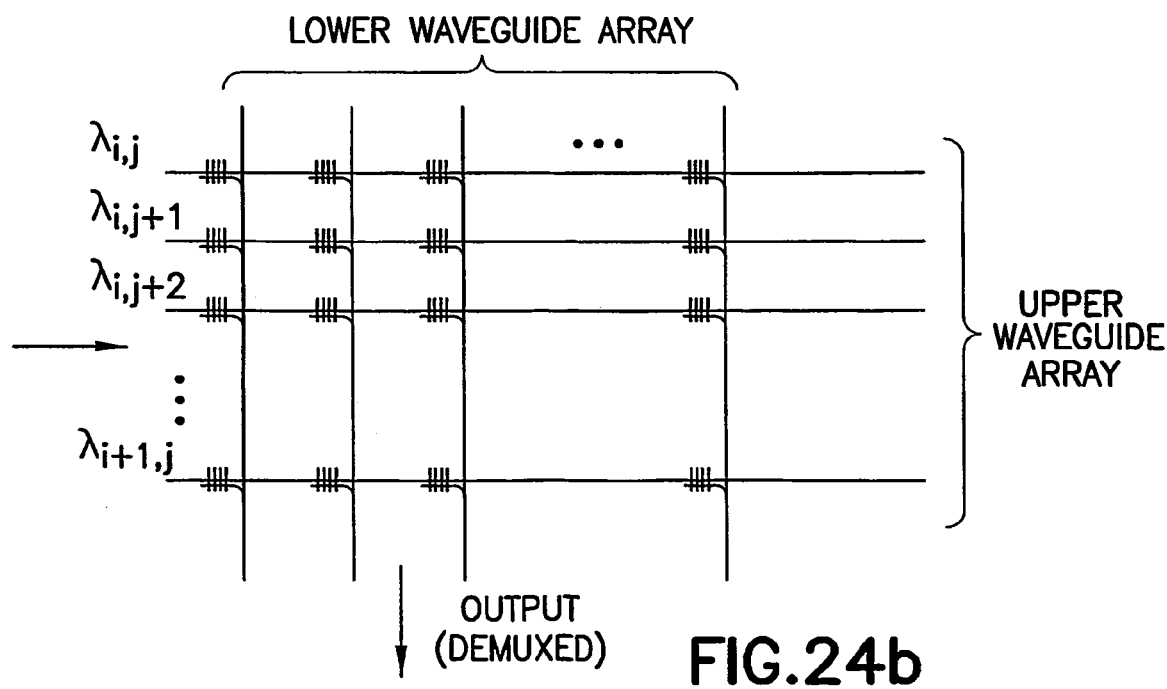
Figure 25A:
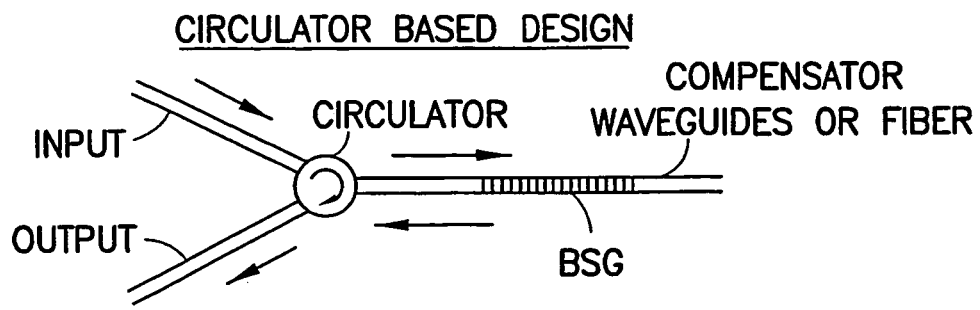
FIGS. 25a-25d are schematics of embodiments of BSG dispersion-slope compensators.
Figure 25B:
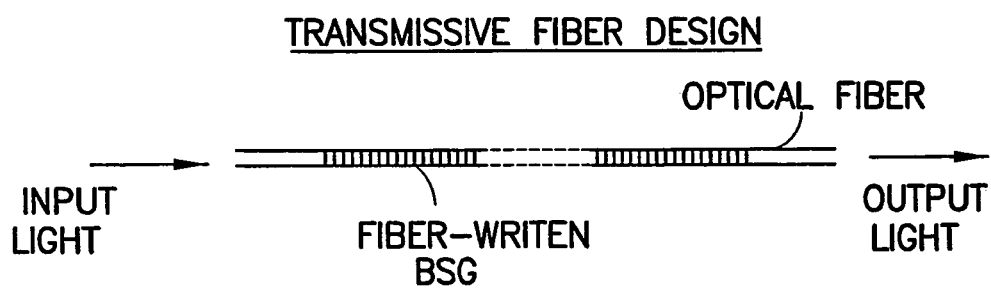
Figure 25C:
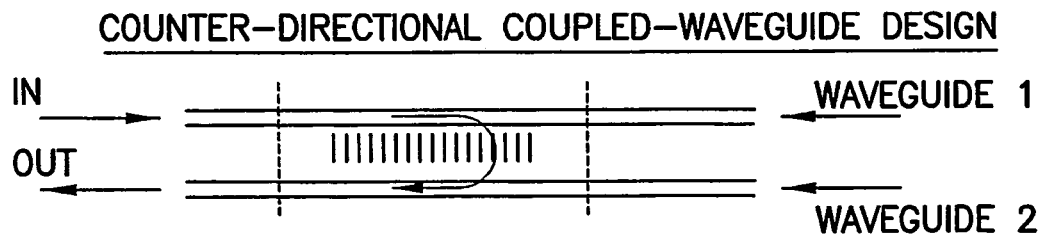
Figure 25D:
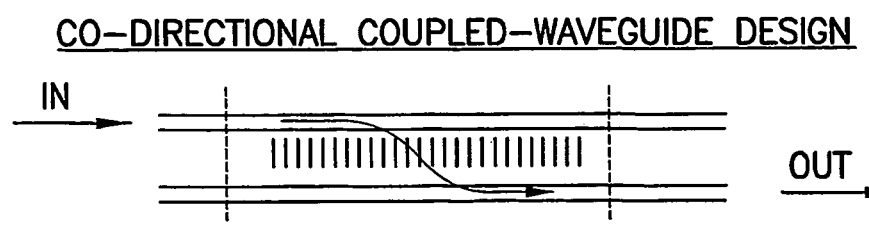

In FIG. 24b, a grid topology router accepts multiplexed input on the left, having more than on incident wavelength on a channel in a lower waveguide. At each intersection, a pass-band BSG couples wavelengths in a particular channel to the waveguides in an upper waveguide, running vertically in the drawing. The result is that $\lambda_{i,j}$ (wavelength lambda entering on the $i^{th}$ guide and having a wavelength for the $j^{th}$ channel) is combined with the radiation of the same channel coming from other inputs.

FIG. 24A, having the same topology as shown in FIG. 12, is a more efficient arrangement for achieving the same result.

Dispersion-slope Compensator

Optical networks generally contend with a property known as dispersion, especially where long transmission distances and high bit-rates are involved. Dispersion arises from the wavelength-dependence of effective index, which in turn produces a wavelength-dependent group delay spectrum for a given type and length of optical fiber. The spectrum of an optical pulse is necessarily finite (i.e. non-zero) in width, dispersion therefore spreads out a pulse as it travels along a fiber, because its various wavelength components will travel at slightly different speeds.

Dispersion compensation can be achieved by "chirping" a Bragg grating: modulating a grating's pitch along its length z, as shown in FIG. 25. FIG. 25A shows an embodiment in which the chirped grating is associated with a circulator. Radiation is directed into the grating, processed and returned to the circulator. FIG. 25B shows a transmissive fiber design. FIG. 25C shows a counter-directional BSG in which the grating the couples two fibers also performs the chirping. FIG. 25D shows a co-directional design. These designs produce a wavelength-dependent phase spectrum which can be tailored to provide the desired group delay spectrum: $\tau_g = -d\phi/d\omega$. The delay for a given free-space wavelength $\lambda_0$ then follows from the round-trip distance to where local pitch has $\lambda_0$ as its Bragg wavelength: $\tau_g(\lambda_0) = 2n_{eff}z(\lambda_0)$, where $z(\lambda_0)$ is the spatial coordinate at which $\Lambda(z) = \lambda_0/2n_{eff}$.

One dispersion embodiment of the present invention begins by determining the ideal (analog) input chirp function, as derived from the group delay spectrum $\tau_g(\lambda_0)$ (grating-imposed delay should of course be the opposite of that at the input). The ideal analog profile is then fed into a quantization filter producing a binary profile that emulates the desired phase characteristics. The quantization filter can be further optimized for minimal phase noise.

Alternate dispersion embodiments stem more directly from the desired group delay spectrum.

It will be appreciated that a variety of these types of embodiments are possible. One embodiment includes a 3-port circulator (light input at port i exits at port i+1, with port 3 "wrapping around" to port 1) that directs light input to port 1 to a waveguide via port 2. A reflective BSG, in accordance with the teachings of the present invention, in the waveguide effects the desired compensating group delay spectrum, thereby directing the dispersion-compensated light back to port 2 of the circulator, following which it emerges at output port 3.

An alternate embodiment shown in FIGS. 26a and 26b that avoids the need for (and cost of) a circulator employs co-directional and/or counter-directional BSG couplers, which couple light from an input waveguide to subsequent waveguide(s) so as to impose the desired group delay spectrum. Depending on factors such as the compensation bandwidth, the temporal span of the group delay spectrum, and whether compensation is full-band or channelized, the intra-device propagation length can exceed the maximum desired device size. In this case, dispersion compensation can be effected over successive waveguide couplings, with coupled waveguides arranged in a winding cascade.

It will be appreciated that embodiments of BSG-based dispersion compensators offer many advantages such as emulating complicated chirp functions in a simpler fashion than present methods (present methods either tackle successive terms in a Taylor expansion of the dispersion characteristic, or achieve a "best-fit" to the ideal delay spectrum using relatively few input parameters). Embodiments using BSG devices in accordance with teachings of the present invention can also provide dispersion compensation individually tailored to multiple simultaneous channels, offering an improvement over solutions, which impose the same correction across all channels. Also, in contrast to some chirped-grating approaches, the embodiments using BSG devices in accordance with teachings of the present invention can be designed to yield a flat in channel reflectance spectrum.

Tunable Dispersion Compensator

Tunable dispersion compensation can be achieved through an arrangement bearing some similarity to a combination of the cascade of co-directional and counter-directional BSGs described above, and the earlier disclosed Vernier-tuning method, along with the dynamic multi-wavelength equalizer, also described above. Referring to FIG. 26a, the cascade of BSGs includes group delay "basis functions" which can be independently tuned relative to one another to effect the desired group delay spectrum.

One embodiment, illustrated in FIG. 26B, employs two tunable counter-directional BSG couplers, each implementing quadratic dispersion functions $D_1$ and $D_2$, with the functional forms:

$$D_1 = a_1(\lambda - \lambda_1)^2 + C_1 \text{ and } D_2 = a_2(\lambda - \lambda_2)^2 + C_2,$$

where the center wavelengths $\lambda_1$ and $\lambda_2$ can be shifted independently through a tuning mechanism such as those outlined above. If the BSGs are cascaded and designed with $a_2 = -a_1$, the resulting dispersion is:

$$D_{net} = D_1 + D_2 = [2a_1(\lambda_2 - \lambda_1)]\lambda + [(\lambda_1^2 - \lambda_2^2) + (C_1 - C_2)],$$

which can be re-written in terms of $\Delta\lambda = \lambda_2 - \lambda_1$:

$$D_{net} = [2a_1(\Delta\lambda)]\lambda + [(2\lambda_1 + \Delta\lambda)(2\lambda_1 - \Delta\lambda) + (C_1 - C_2)]$$

Thus, dispersion slope $2a_1(\Delta\lambda)$ can be adjusted as desired by appropriately selecting $\Delta\lambda$, and the intercept is set by appropriately setting $\lambda_1$. This approach can be applied to arbitrarily high orders of dispersion by employing next-higher-order dispersion basis functions.

Variable-feedback Supergrating Laser (Tunable and/or Multi-wavelength)

Figure 27A:
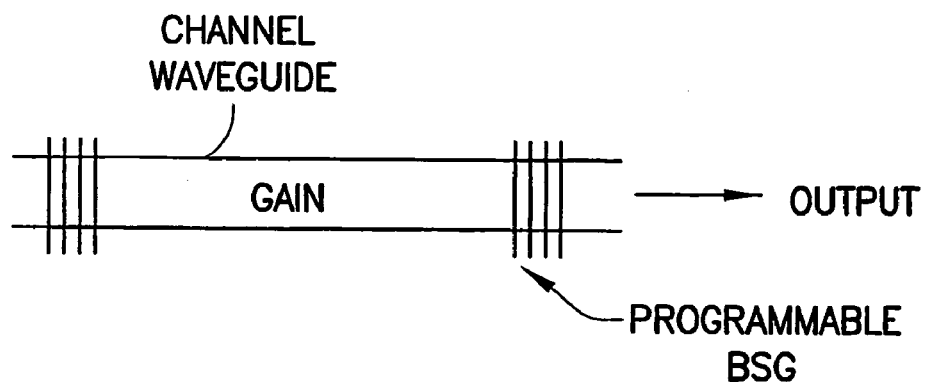
FIGS. 27a-27c are schematics of a variable-feedback supergrating laser.
Figure 27B:
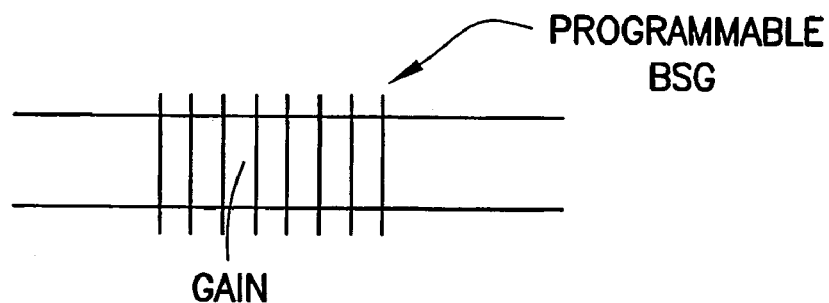
Figure 27C:
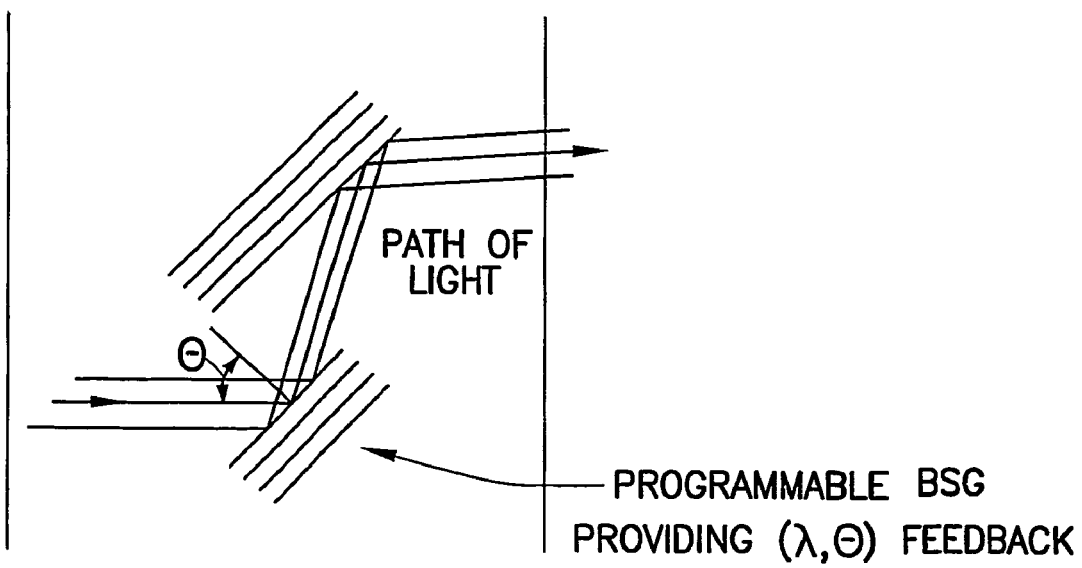

Referring to FIGS. 27a-27c, there is shown embodiments of variable feedback supergrating lasers. In these embodiments, the programmable BSG is combined with an optical gain medium to produce a tunable laser with single-wavelength or multi-wavelength operation. In FIG. 27A, two programmable BSGs can create resonance at one or more wavelengths. In FIG. 27B, a programmable BSG grating within the gain medium can control the output spectrum and also its power distribution. In FIG. 27C, the programmable BSGs can change the wavelength and also the angle, so that the wavelength and also the phase of the output radiation can be controlled.

It will be appreciated that any configuration employing gratings as feedback elements, including but not limited to DBR, DFB, alpha-laser, and ring oscillator configurations, can be retrofitted by replacing some or all of the corresponding diffractive element(s) in the traditional design with programmable BSGs, in accordance with the teaching of the present invention.

For a single-wavelength laser embodiment, the BSG-based device can control the position of the laser line, its line width, and/or its strength. In addition, it can be combined with monitoring of the above parameters (directly or indirectly, such as through temperature, current, or voltage) to form a feedback system, to control one or more of these same parameters.

The BSG's design (or "program") can be altered in an otherwise similar configuration to produce a multi-wavelength laser, offering independent control for each of several laser wavelengths or selection of a single wavelength. Lasing channels can be tuned, added, and dropped independently, and their relative output power can be balanced as desired. As described above, a monitor can be added to form a feedback loop to control any of these parameters.

Beam Combiner (Reverse of Beam-splitter)

Figure 28A:
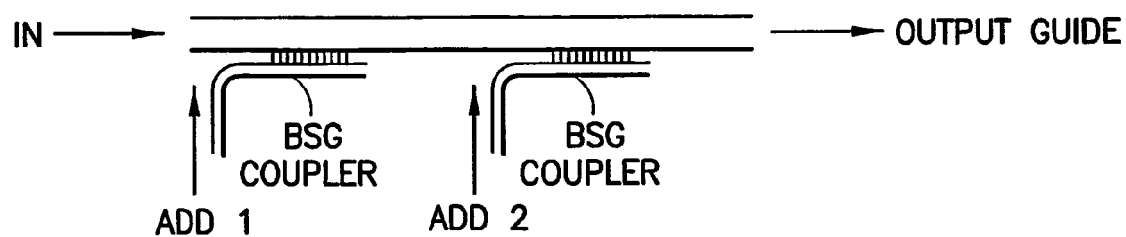
FIG. 28 is a schematic of beam combiners, in coupled-waveguide and 2D BSG embodiments.
Figure 28B:
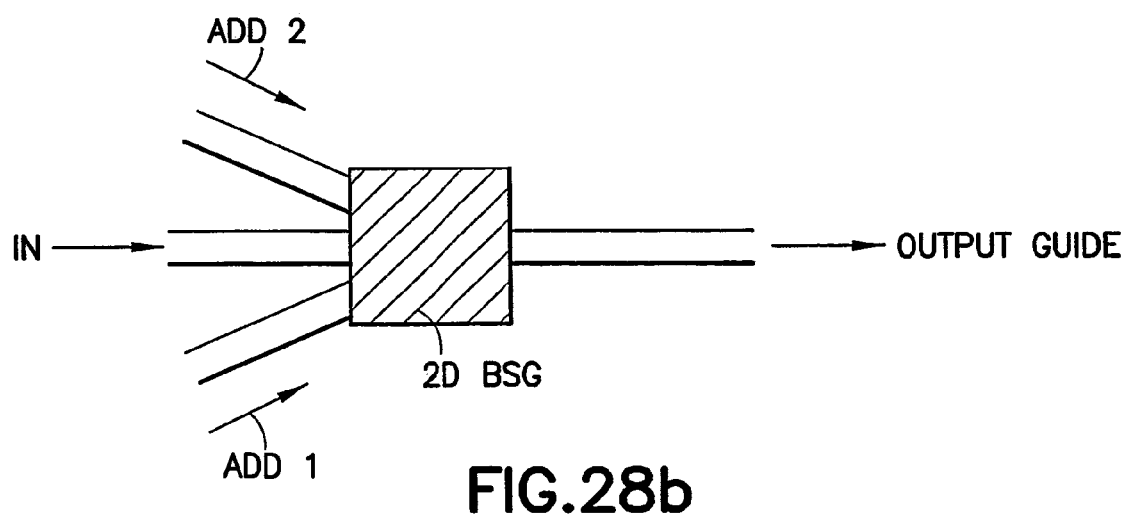

A beam combiner as embodiment, as shown in FIG. 28, accepts input from one or more sources and streams them into a common output. In FIG. 28A, successive BSG couplers add power at one or more wavelengths to the power flowing from left to right in the horizontal waveguide. In FIG. 28B, a two-dimensional BSG accepts three inputs and directs the radiation out along the waveguide. Applications include combining the power from multiple lasers (termed "power combiner" in this context), as is done for example with Raman amplifiers to achieve sufficient pump power. It would be especially attractive in this case to integrate such a device directly with the semiconductor laser array; the BSG is very well suited for this purpose.

A variety of embodiments are possible, including some combination of one or more BSG couplers and 2D supergratings to combine multiple beams (possibly of the same wavelength) into one. In the case of the 2D supergrating, this essentially corresponds to the reverse of splitting an input into multiple output beams.

Multi-wavelength/broadband Isolator/circulator

Optical isolators are devices that block the passage of one or more wavelengths along a waveguide, in one or both directions. They are used to suppress back-reflection, cross talk, and/or unwanted wavelength bands (e.g. pump wavelengths).

A circulator is an N-port device which routes light input at port i to port (i+1), with input to port N "wrapped around" to port 1, and is often used in conjunction with optical devices with an output emerging from the input port (e.g. certain embodiments of optical delay lines, dispersion compensators, and lambda routers).

Figure 29A:
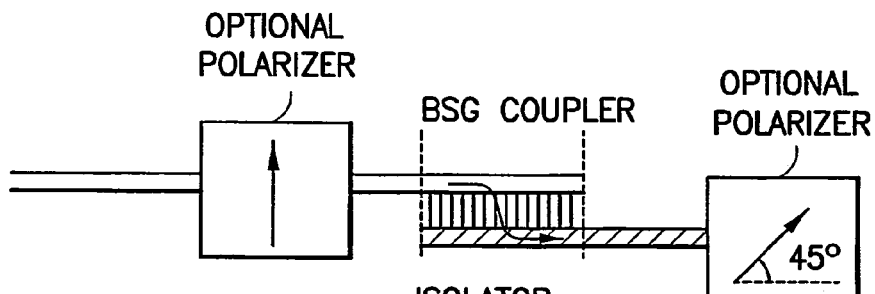
FIG. 29a is a schematic of a BSG-based isolator.
Figure 29B:
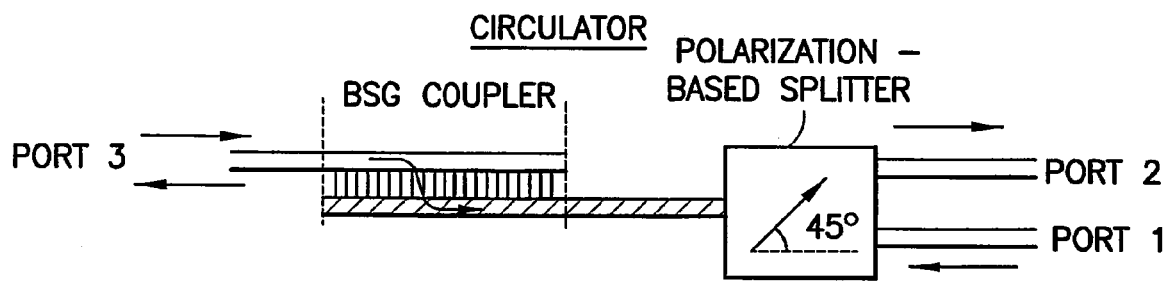
FIGS. 29b-29c are schematics of 4-port coupled-waveguide circulators.
Figure 29C:
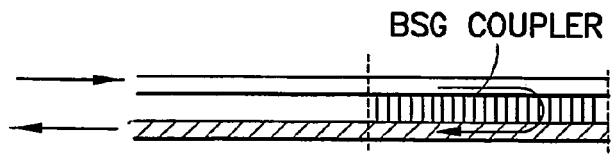
Figure 30:
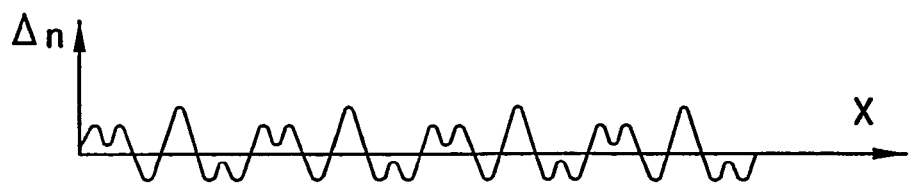
FIG. 30 is an analog index profile from a plot of refractive index change delta-n ($\Delta n$) versus distance (x)

FIGS. 29*a* and 29*b-c* show schematics of a BSG-based isolator embodiment and 4-port coupled-waveguide circulator, respectively. Both isolators and circulators employ some means of subverting time-reversal symmetry: i.e. light approaching the device from one direction is treated differently from light approaching from the opposite direction. This is typically achieved using magneto-optic and/or optically active materials (such as a Faraday rotator), in conjunction with birefringent and/or polarizing elements.

FIG. 29A, for example, shows an isolator in which radiation coming in from the left passes through a polarizer, then through a Faraday rotator that rotates the polarization by 45 degrees, which passes through the second polarizer. Radiation entering from the left is polarized, rotated by the rotator and then blocked by the second polarizer.

FIG. 29B shows an example of a circulator, in which radiation entering from the right on port 1 is rotated by the rotator (e.g. 45 degrees), reflected back from port 3, rotated again and passes through the splitter to port 2.

FIG. 29C shows an example of a rotator that may be used with the foregoing or other apparatus. Radiation enters from the left on the upper waveguide, is coupled to the lower waveguide by a BSG coupler in the presences of a, Faraday material and therefore also is rotated in polarization.

Supergratings, in accordance with the teachings of the present invention can be combined with magneto-optic materials and/or polarizing elements to produce isolators and circulators offering wavelength-selective operation on pre-selected channels, or over broad band(s) of wavelengths.

BSG Photonic Band Gap Materials

An important advance in optical theory in the past few decades is the concept of the photonic band gap (PBG). This realization that a two- or three-dimensional periodic modulation of a material's refractive index can create optical wavelength ranges at which no light can propagate, regardless of direction, has proved to be fruitful in application. Applications include micro-dot lasers, sharp waveguide turns, high-Q optical filters, and wavelength-selective optical couplers.

Nevertheless, the PBG is essentially a two- or three-dimensional extension of the Bragg grating. The BSG concept, as an extension of the Bragg grating into wavelength space, may be combined with the PBG to create a whole new set of optical materials.

A highly advantageous feature of BSG-PBG materials may well be their departure from the high refractive index contrasts required by conventional PBG materials. Embodied as a periodic lattice of refractive index features, conventional PBGs exhibit different periodicity in different directions. Each direction is therefore characterized by a different effective Bragg grating, each in turn associated with a particular band gap—a range of wavelengths prohibited from propagating in that direction as a consequence of the grating. The width of this wavelength gap is directly proportional to the effective grating's strength, which in turn corresponds to the PBG's refractive index contrast. However, to forbid propagation for a particular wavelength for all directions, thereby forming the "complete" bandgap which defines the PBG, all the individual wavelength gaps must overlap at the wavelength in question, thus, as those skilled in the art are aware, imposing a minimum refractive index contrast for the PBG.

FIG. 37 shows in FIG. 37A a hexagonal arrangement of dots representing regions of different refractive index. FIG. 37B shows a corresponding hexagon in wave number space. Those skilled in the art are aware that ordinary materials exhibiting the PBG effect have a regular geometric arrangement that produces an outline in wave number space. In FIG. 37B, for example, the hexagonal array of dots in FIG. 37A is reflected in a hexagon in k-space. In order to suppress radiation propagation (of a certain wavelength represented by the dotted circle) in all directions, therefore, the thickness of the hexagon in k-space must be such that the circle representing the relevant wavelength can be inscribed within the band-gap hexagon. This requirement imposes a requirement of unneeded band gap suppression. For example, the regions at the outer corners of the hexagon in FIG. 37B is not needed, since the dotted line is at the inner corners. Similarly, the regions in the centers of sides are not needed because the dotted line is at the outer edge in that area.

Unlike conventional PBGs, the BSG is not restricted to a periodic lattice and its implied directional variation in periodicity. Instead, a two- or three-dimensional BSG can be designed to exhibit a near-arbitrary band of effective periodicity in any direction. This corresponds directly to the one-dimensional BSG's control over its diffractive spectrum This design freedom obviates the reliance on the grating's refractive index contrast to thicken the individual band gaps until they overlap. Instead, the pattern of index change may be set geometrically to reinforce the refractive index patterns of the band gaps that cause overlap in the first place. Any extra strength afforded by the available index contrast can then be applied to subject more wavelengths to the PBG's effect. FIG. 38 shows in FIG. 38A a non-periodic arrangement of pixels that provide for the suppression of transmission in a particular wavelength range in any direction in a more economical use of resources. The angular dependence of the pixel pattern is set such that the dotted line (the same dotted line as in FIG. 37) is bounded by a smaller, uniform margin. If desired, the margin in FIG. 38 could be increased to cover a greater wavelength range.

Thus, for a given technique of index modulation (e.g. ion implantation) a BSG-PBG material can exclude a greater wavelength range than conventional PBG materials.

In addition, the new materials adcording to the invention may, in the same area, exclude radiation in a first wavelength range and manipulate radiation in one or more other wavelength ranges—e.g. exclude pump radiation while deflecting, focusing, etc. radiation in a generated wavelength band.

The dramatic reduction in the necessary refractive index contrast offered by the BSG-PBGs synthesis may indeed overcome a major practical challenge in PBG fabrication. However, this reduction comes at a cdst: a lower-contrast grating also implies a longer required interaction length through which the grating affects light. This is also true for the PBG, however, and while the effect may be an important consideration for certain applications, it may be mitigated, overcome or even prove beneficial for many others.

The BSG can do more than simply improve upon the practicality of PBG implementation. For example, the BSG enables materials exhibiting several photonic band gaps, stemming directly from the capacity to emulate several superimposed gratings which inspired our first explorations. Such materials may be useful in a number of applications, primarily those employing several optical wavelengths, such as systems with separate pump and signal wavelengths, as well as wavelength converters. More generally, the BSG allows for complete control over the optical band structure, including the width and position of band gaps as well as the optical density of states and the dispersion relation.

Figure 39:
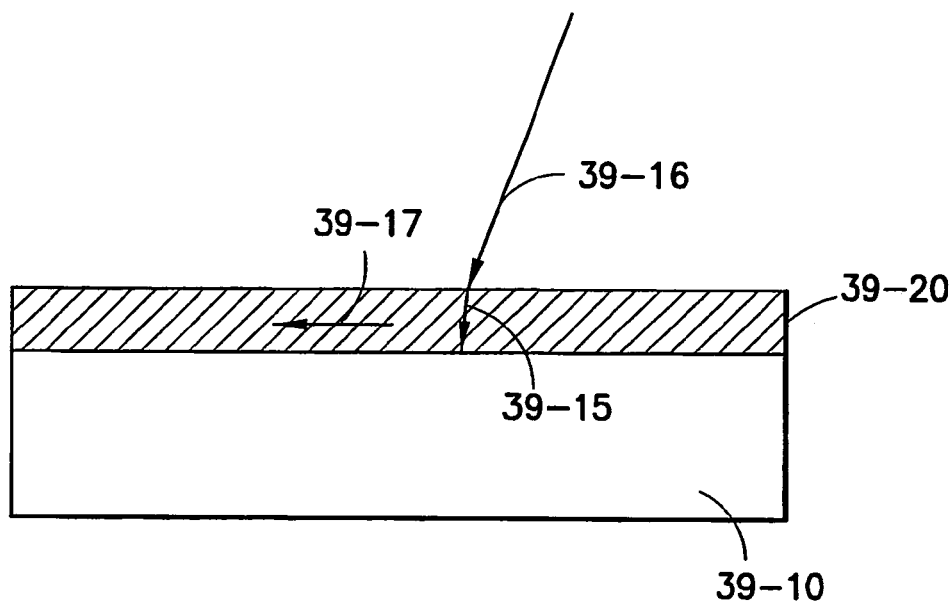

FIG. 39 shows a cross section of a high efficiency solar cell or other photodetector using a PBG material according to the invention. Substrate 39-10 is a conventional material that exhibits the photoelectric effect, e.g. silicon. Layer 39-20 is a material that ordinarily permits the propagation of light of the relevant wavelength. According to the invention, a BSG-PBG pattern has been impressed on the material 39-20, so that propagation in the transverse direction indicated by arrow 39-17 is suppressed. Radiation that would otherwise propagate transversely is then scattered by the BSG-PBG pattern and winds up preferentially scattering with a vertical component (e.g. according to arrow 39-15).

A greater fraction of the incident radiation is thus absorbed by the photoelectric material 39-10.

Figure 40:
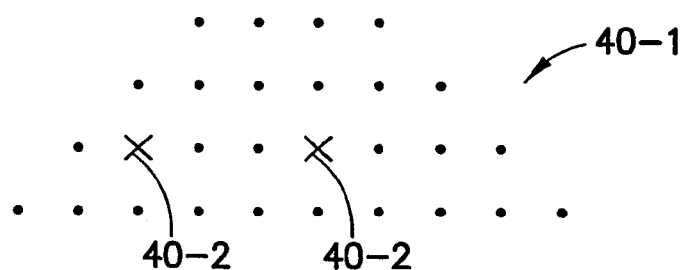

FIG. 40 shows an array of PBG material 40-1 arranged in a customary pattern. Two dots of the pattern, 40-2, have been removed, establishing a pair of micro-dot lasers (conventional pump radiation being omitted for clarity). As many microdot lasers as desired may be arranged in any desired geometrical layout.

Figure 41:
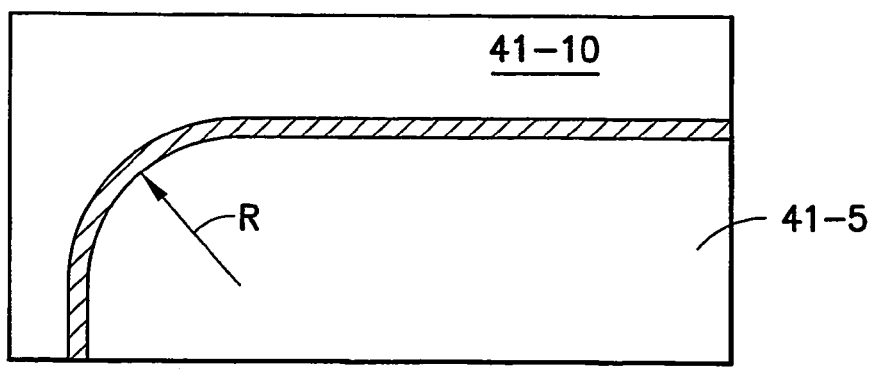

FIG. 41 shows a top view of a BSG-PBG material 41-5 that excludes radiation in a relevant wavelength range. The BSg pattern does not extend to waveguide 41-10, which therefore permits the passage of radiation in that wavelength range. A curve having a radius of curvature R, less than the conventional limit, referred to as a reference value, has been formed in the waveguide. Those skilled in the art are aware that a conventional material would have an excessive amount of scattering when passing through a curve with a radius of curvature less than the reference value. The BSG-PBG material permits the formation of the waveguide with reduced losses.

Figure 42:
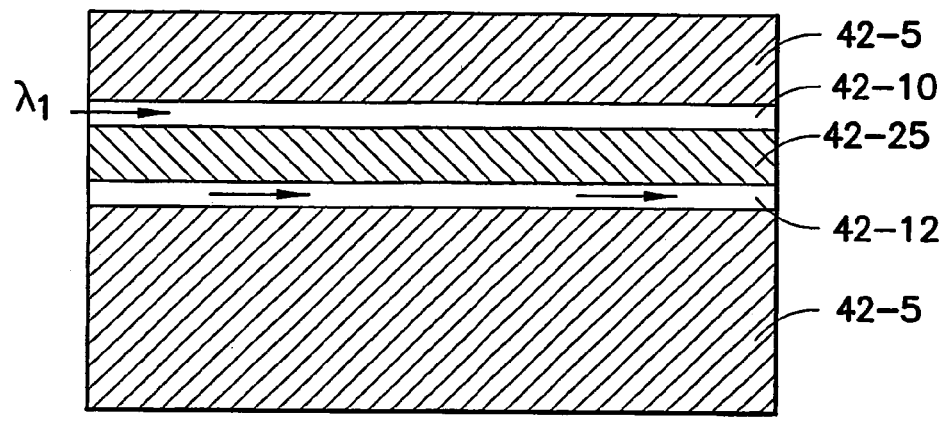

FIG. 42 illustrates a pair of waveguides 42-10 and 42-12 formed in a BSG-PBG material 42-5. As an optional feature, the area 42-25 between the two waveguides has been provided with a BSG-PBG material 42-25 that has a longer attenuation length at the wavelength being transmitted by waveguides 42-10 and 42-12. Thus, coupling between the waveguides is facilitated. The different material is not necessary, and the same material could be used, with an appropriate spacing between waveguides (or the BSG-PBG material could be omitted between the waveguides).

As an additional option, the general provision of PBG could be dispensed with and a PBG could be placed between the waveguides 42-10 and 42-12. The material between the two waveguides could be fabricated to permit coupling between the waveguides, e.g. by structuring the PBG pattern such that propagation parallel to the waveguides is not allowed, but propagation (i.e. coupling) between the waveguides is allowed.

The foregoing is an example of a directional PBG material meaning a material having a pixel pattern that suppresses propagation within a wavelength band in selected directions.

Figure 43:
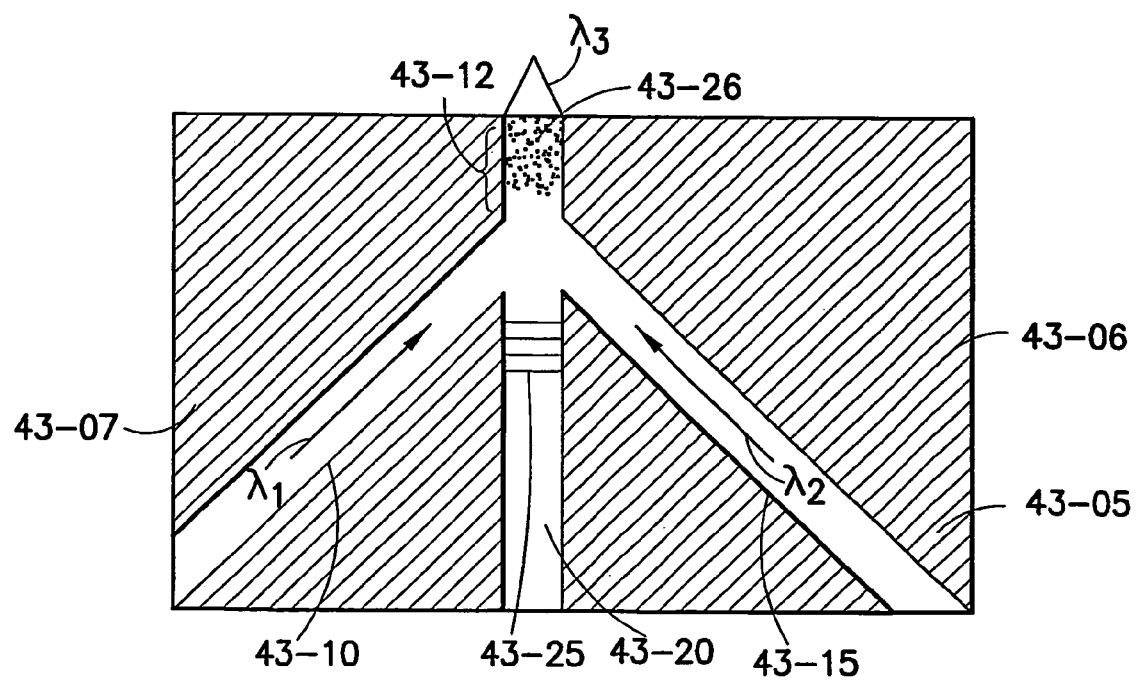
Figure 44:
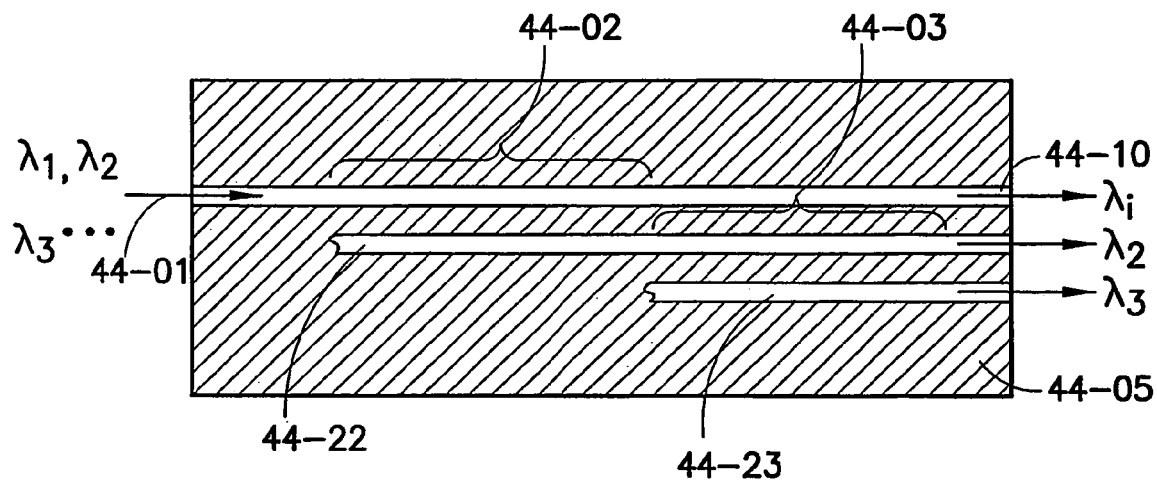
Figure 45:
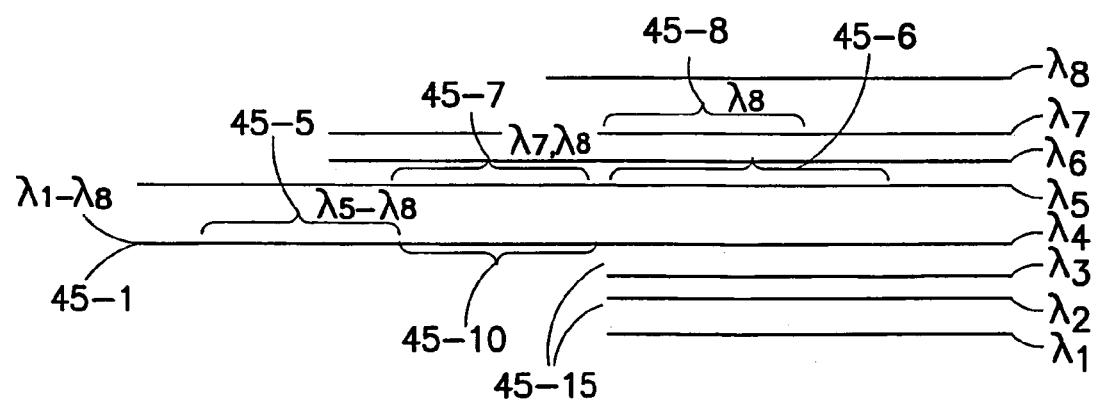

FIG. 43 illustrates a top view of a unit employing a non-linear effect. Rectangle 43-05 represents an area of a material that exhibits a non-linear effect and also has been impressed with a PBG pattern that suppresses propagation at wavelengths $\lambda_1$, $\lambda_2$ and $\lambda_3$. In the example illustrated, $\lambda_1$ and $\lambda_2$ are pump wavelengths, propagating along waveguides 43-10 and 43-15, respectively and $\lambda_3$ is the output wavelength of the relevant non-linear interaction, propagating along output waveguide 43-20. The initial section of waveguide 43-20 is an optional waveguide in this device that may be used, e.g. to supply input radiation at $\lambda_3$, to which the result of the non-linear interaction will be added.

Radiation at $\lambda_1$ and $\lambda_2$ combine in the overlap area to generate radiation at $\lambda_3$, as is known in the art. The PBG pattern outside the waveguides confines the radiation.

Within section 43-12 of waveguide 43-20, a pixel pattern 43-26 focuses the output radiation to a point as shown. Section 43-25 of the waveguide 43-20 reflects radiation at the output wavelength, so that it is directed as required (upward in the drawing) and is not wasted. If desired, or if required by limited resources, the PBG pattern on the left, denoted by 43-07, could be set to confine radiation of $\lambda_1$ and the pattern on the right, denoted by 43-06, could be set to confine radiation of $\lambda_2$, with the radiation $\lambda_3$ being confined only by the pattern in the area 43-12. Thus, the (limited) capabilities of the PBG pattern could be reserved for use only where required.

It should be understood that the foregoing description is only illustrative of the invention. Various alternatives and modifications can be devised by those skilled in the art without departing from the invention. Accordingly, the present invention is intended to embrace all such alternatives, modifications and variances, which fall within the scope of the appended claims.

We claim:

1. An optical device comprising at least two waveguides in at least one propagation layer of grating material, a first one of said waveguides adapted for transporting input radiation from a first input port to output radiation exiting from a first output port and a second one of said waveguides transporting input radiation from a second input port to output radiation exiting from a second output port, and a one- or two-dimensional (binary) supergrating in a modulation layer of grating material for coupling input radiation propagating from one of said first and second input ports along a corresponding waveguide to the other of said first and second waveguides; and wherein said one- or two-dimensional supergrating comprises an array of discrete pixels and an array of controllable means each coupled to one of the discrete pixels, the controllable means being responsive to a set of control signals, for altering the modal index of refraction value in corresponding discrete pixels in said array in at least two modes.

2. A device according to claim 1, in which said one- or two-dimensional supergrating couples input radiation in said first waveguide traveling in a first direction to said second waveguide traveling in a second direction substantially parallel to said first direction.

3. A device according to claim 1, in which said one- or two-dimensional supergrating couples input radiation in said first waveguide traveling in a first direction to said second waveguide, traveling in a second direction substantially opposite to said first direction.

4. An optical device comprising at least two waveguides in at least one propagation layer of grating material, a first one of said waveguides adapted for transporting input radiation from a first input port to output radiation exiting from a first output port and a second one of said waveguides transporting input radiation from a second input port to output radiation exiting from a second output port, and a one- or two-dimensional (binary) supergrating in a modulation layer of grating material for coupling input radiation propagating from one of said first and second input ports along a corresponding waveguide to the other of said first and second waveguides; and wherein said first and second waveguides are symmetric and said one- or two-dimensional supergrating comprises a central portion between said first and second waveguides having a first pattern of high and low values of index of refraction and first and second outer portions having a second pattern of high and low values of index of refraction having the opposite sense to said first pattern, whereby said one- or two-dimensional supergrating suppresses back reflection in said first and second waveguides.

5. A device according to claim 1, wherein the at least two modes include a first mode in which said device couples input radiation in said first waveguide traveling in a first direction to said second waveguide traveling in a second direction substantially parallel to said first direction and a second mode in which said device couples input radiation in said first waveguide traveling in a first direction to said second waveguide traveling in a second direction substantially opposite to said first direction.

6. A device according to claim 5, in which said one- or two-dimensional supergrating comprises an array of controllable means responsive to a set of control signals that are adapted to switch radiation of any of N different wavelengths between said first and second waveguides in said first and second modes in response to corresponding values of said control signal, whereby said device may be controlled to pass radiation in any one of N wavelengths from any of said input ports to any of said output ports, thereby forming a wavelength-dependent supergrating 2×2 coupler.

7. A device according to claim 1, wherein the at least two modes include a first mode in which said device couples input radiation in said first waveguide to said second waveguide and a second mode in which said device couples input radiation in said second waveguide to said first waveguide.

8. A device according to claim 7, in which said one- or two-dimensional supergrating comprises an array of controllable means responsive to a set of control signals that are adapted to switch radiation of any of N different wavelengths between said first and second waveguides in said first and second modes in response to corresponding values of said control signal, whereby said device may be controlled to pass radiation in any one of N wavelengths from any of said input ports to any of said output ports, thereby forming a wavelength-dependent supergrating 2×2 coupler.

9. A device for processing optical radiation in a set of wavelengths comprising a set of waveguides, each waveguide having at least one input port and at least one output port, in which an input beam of radiation traveling on an input waveguide of the set of waveguides passes through at least one wavelength dependent supergrating coupler that couples a selected wavelength band in or out of the input waveguide, so that the remaining optical beam in the input waveguide has a wavelength range that has been added to or subtracted from by the selected wavelength band; and wherein said wavelength dependent supergrating coupler comprises an array of discrete pixels and an array of controllable means each coupled to one of the discrete pixels, the controllable means being responsive to a set of control signals, for altering the modal index of refraction value in corresponding discrete pixels in said array in at least two modes.

10. A device according to claim 9, in which said wavelength dependent supergrating coupler adds radiation from a second input port to said input beam.

11. A device according to claim 9, in which said wavelength dependent supergrating coupler subtracts radiation in a wavelength subtraction range from said input beam.

12. A device according to claim 9, in which at least two supergrating couplers are connected in series, with a first supergrating coupler controlling a first wavelength range and a second supergrating coupler controlling a second wavelength range.

13. An optical device comprising an input port for receiving incident radiation and directing the radiation on an array of pixels comprising a supergrating, each pixel having a modal index of refraction selected from a set of index values, the array of pixels collectively processing the incident radiation and directing at least one beam of output radiation to at least one output port, in which at least some of the array of pixels are connected to control means for controllably setting the value of the modal index of refraction of the corresponding pixels in response to a control signal, so that the process applied to the incident radiation may be determined by the control signals applied to the control means.

14. An optical device comprising:
first and second optical wave transmitting means;
a means for coupling optical signals between the first and second optical wave transmitting means;
a one- or two-dimensional array of pixels disposed on the coupling means, the pixels each comprising a means for altering a modal index of refraction value in at least two modes in discrete locations on said coupling means; and
a means for controlling the modal index of refraction altering means to effect a one- or two-dimensional (binary) wavelength dependent supergrating in the coupling layer.

15. The optical device of claim 14, wherein the first and second optical wave transmitting means are first and second wave guides, each waveguide having at least one input port and at least one output port.

16. The optical device of claim 14, wherein modal index of refraction altering means comprise actuated beams selectively movable relative to the coupling means.

17. The optical device of claim 14, wherein the coupling means is a modulation layer optically coupled to the first and second optical wave transmitting means.

18. The optical device of claim 14, wherein the modal index of refraction altering means each comprise at least one of a thermal, electro-optic, magneto-optic, opto-restrictive, mechanical strain, current injection, optical illumination, liquid crystal, reconfigurable molecule, chemical interaction, and mechanical translation device.

19. The optical device of claim 14, wherein each of the plurality of pixels is at least one of triangular, hexagonal, or rectangular shaped.

20. A method for controlling optical radiation comprising:
applying a pattern of control signals to discrete pixels in a one- or two-dimensional array of discrete modal index altering means to effect a supergrating on a modulation layer disposed on first and second waveguides;
inputting radiation into the first waveguide; and
coupling a portion of the input radiation through the modulation layer to the second waveguide, the coupled portion corresponding to a wavelength corresponding to the pattern of control signals.

21. The method of claim 20, wherein applying the pattern of control signals to discrete pixels in the one- or two-dimensional array of discrete modal index altering means to effect the supergrating on the modulation layer comprises applying a pattern of voltages to an array of electrically addressable electrodes disposed on the modulation layer to establish a supergrating on the modulation layer.

22. The method of claim 20, wherein applying the pattern of control signals to discrete pixels in the one- or two-dimensional array of discrete modal index altering means to effect the supergrating on the modulation layer comprises actuating a first subset of a plurality of microelectromechanical system (MEMS) fingers to touch the modulation layer to establish a supergrating on the modulation layer.

23. The method of claim 22, further comprising actuating a second subset of the plurality of MEMS fingers to move away from the modulation layer.

24. The method of claim 20, wherein coupling a portion of the input radiation through the modulation layer to the second waveguide comprises coupling the input radiation in the first waveguide traveling in a first direction to the second waveguide traveling in a second direction substantially opposite to the first direction.

25. The method of claim 20, wherein applying the pattern of control signals to discrete pixels in the one- or two-dimensional array of discrete modal index altering means to effect the supergrating on the modulation layer disposed on first and second waveguides comprises applying a first pattern of control signals to the discrete pixels to effect a first supergrating coupling input radiation in the first waveguide traveling in a first direction to the second waveguide traveling in a second direction substantially parallel to said first direction, the method further comprising applying a second pattern of control signals to the discrete pixels to effect a second supergrating coupling input radiation in the first waveguide traveling in a first direction to the second waveguide traveling in a second direction substantially opposite to said first direction.

* * * * *

UNITED STATES PATENT AND TRADEMARK OFFICE
CERTIFICATE OF CORRECTION

PATENT NO. : 7,356,224 B2 Page 1 of 1
APPLICATION NO. : 10/519577
DATED : April 8, 2008
INVENTOR(S) : Levner et al.

It is certified that error appears in the above-identified patent and that said Letters Patent is hereby corrected as shown below:

| On the Title Pg. | Reads | Should Read |
|---|---|---|
| Item (63) | "Continuation-in-part of application No. 10/188,530, filed on Jul. 3, 2002." | --This application is a 371 of PCT/US03/20237, filed June 27, 2003, which claims the benefit of provisional application No. 60/392,306, filed June 27, 2002 and claims the benefit of provisional application No. 60/393,209, filed July 1, 2002. This application is a Continuation-in-part of application No. 10/188,530, filed July 3, 2002, which claims the benefit of provisional application No. 60/302,904, filed July 3, 2001.-- |

Signed and Sealed this

Thirteenth Day of July, 2010

David J. Kappos
*Director of the United States Patent and Trademark Office*